(12) United States Patent
Braumoeller et al.

(10) Patent No.: US 8,428,988 B1
(45) Date of Patent: Apr. 23, 2013

(54) GENERATING CURRENT ORDER FULFILLMENT PLANS TO INFLUENCE EXPECTED FUTURE CONDITIONS

(75) Inventors: Rick Braumoeller, Bainbridge Island, WA (US); Richard Brinkerhoff, Burien, WA (US); Jeff Holden, Seattle, WA (US); Dennis Lee, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/367,284

(22) Filed: Feb. 6, 2012

Related U.S. Application Data

(63) Continuation of application No. 11/769,588, filed on Jun. 27, 2007, now Pat. No. 8,121,876, which is a continuation of application No. 09/965,125, filed on Sep. 27, 2001, now Pat. No. 7,295,990.

(51) Int. Cl.
*G06F 17/60* (2006.01)

(52) U.S. Cl.
USPC .................................................... 705/7.11

(58) Field of Classification Search ................... 705/7.11
See application file for complete search history.

(56) References Cited

U.S. PATENT DOCUMENTS

| | | | |
|---|---|---|---|
| 5,631,827 A | 5/1997 | Nicholls et al. | 395/228 |
| 5,897,629 A | 4/1999 | Shinagawa et al. | 706/13 |
| 6,415,195 B1 | 7/2002 | Gleditsch et al. | 700/99 |
| 6,415,196 B1 | 7/2002 | Crampton et al. | 700/100 |
| 6,587,827 B1 | 7/2003 | Hennig et al. | 705/1 |
| 6,728,948 B1 | 4/2004 | Baxter et al. | 717/108 |
| 6,954,735 B1 | 10/2005 | Djupsjobacka et al. | 705/27 |
| 7,058,587 B1 | 6/2006 | Horne | 705/7 |
| 7,107,226 B1 | 9/2006 | Cassidy et al. | 705/26 |
| 7,212,976 B2 | 5/2007 | Scheer | 705/1 |
| 7,546,255 B2 | 6/2009 | Cruz et al. | 705/28 |
| 2002/0016759 A1 | 2/2002 | Macready et al. | 705/37 |
| 2002/0026347 A1 | 2/2002 | Yanagino et al. | 705/10 |

(Continued)

FOREIGN PATENT DOCUMENTS

| | | |
|---|---|---|
| WO | 00/68859 | 11/2000 |
| WO | 01/08071 | 2/2001 |

OTHER PUBLICATIONS

A subset of pages from carmax.com, as archived using www.archive.org, retrieved Jun. 6, 2008, from http://web.archive.org/web/*/http://carmax.com, 9 pages.

(Continued)

*Primary Examiner* — Romain Jeanty
(74) *Attorney, Agent, or Firm* — Seed IP Law Group PLLC

(57) ABSTRACT

A method, system, and computer-readable medium for dynamically generating actual fulfillment plans for a current order or a potential order so as to enhance the future fulfillment process for expected future orders is described. In some situations, actual delivery information based on one or more such actual fulfillment plans will then be provided to a customer, such as by displaying actual delivery date and/or time before or during the ordering process based on one or more actual fulfillment plans that can be or will be used to fulfill the order. A variety of types of criteria can be used to evaluate the effects of using a fulfillment plan to fulfill a current order, including criteria that consider the modeled future cost of fulfilling expected future orders, such as an overall cost of fulfilling all orders during a specified time period that is at least partially in the future.

20 Claims, 26 Drawing Sheets

U.S. PATENT DOCUMENTS

| | | | |
|---|---|---|---|
| 2002/0072986 A1 | 6/2002 | Aram | 705/26 |
| 2002/0082954 A1 | 6/2002 | Dunston | 705/28 |
| 2002/0095307 A1 | 7/2002 | Greamo et al. | 705/1 |
| 2002/0133387 A1 | 9/2002 | Wilson et al. | 705/8 |
| 2002/0156663 A1 | 10/2002 | Weber et al. | 705/7 |
| 2002/0169657 A1 | 11/2002 | Singh et al. | 705/10 |
| 2002/0188499 A1 | 12/2002 | Jenkins et al. | 705/10 |
| 2003/0033180 A1 | 2/2003 | Shekar et al. | 705/7 |
| 2003/0061084 A1 | 3/2003 | Menninger | 705/8 |
| 2004/0098316 A1 | 5/2004 | Philippe et al. | 705/26 |
| 2005/0197892 A1 | 9/2005 | Bilibin et al. | 705/13 |
| 2007/0073552 A1 | 3/2007 | Hileman | 705/1 |

OTHER PUBLICATIONS

Promodel Resource Central, 1998, retrieved Mar. 25, 2005, from http://web.archive.org/web/19981201192819/www.aspiresys.com/pmcentral/html/variable_resour . . . , 2 pages.

"SAS OnlineDoc Version 8," 1999, retrieved Jul. 6, 2006, from http://v8doc.sas.com/sashtml/welcome.htm, 29 pages.

"SAS/OR Software," retrieved Jul. 5, 2006, from http://web.archive.org/web/19980129201001/www.sas.com/software/components/or.html, 7 pages.

United States Securities and Exchange Commission Form 10-K/A for Fiscal Year 1999 Amazon.com, Inc., 40 pages.

Akbay, K., "Using simulation optimization to find the best solution,", *IIE Solutions*, 28(5):24-29, May 1996, 6 pages.

U.S. Appl. No. 09/065,121, filed Sep. 27, 2001, Braumoeller et al.

U.S. Appl. No. 60/243,400, filed Oct. 1, 2000, Keller et al.

Al-Shammari, M., "Linear programming applied to a production blending problem: a spreadsheet modeling approach," *Production and inventory Management*, 38(1):1-7, First Quarter 1997, 7 pages.

Beamon, B., "Supply Chain Design and Analysis: Models and Methods," *Int. J. Production Economics*, 55:281-294, 1998, 14 pages.

Benson, D., "Simulation Modeling and Optimization Using Promodel," *Proceedings of the 1997 Winter Simulation Conference*, pp. 587-593, 1997, 7 pages.

Cohen, M. et al., "Decision Support with Web-Enabled Software," *Interfaces*, 31(2):109,Linthicum Mar./ Apr. 2001, 14 pages.

Cohen, M. et al., "Supply Chain Optimization ASAP: A Methodology for Strategic and Tactical Planning," SAS Institute Inc. Applications Division Supply Chain Center, Jan. 1999, 14 pages.

Czanecki, H., et al., "Using Simulation to Schedule Manufacturing Resources," *Proceedings of the 1997 Winter Simulation Conference*, pp. 750-757, 1997, 8 pages.

Elhafsi, M., et al., "Negotiating Price/Delivery date in a Stochastic Manufacturing Environment," IIE Transactions, 1999, 31, pp. 255-270, 16 pages.

Gan, B., et al., "Distributed Supply Chain Simulation Across Enterprise Boundaries," *Proceedings of the 2000 Winter Simulation Conference*, pp. 1245-1251, 2000, 7 pages.

Gladwin, B., "Introduction to ProcessModel and ProcessModel 9000," *Proceedings of the 1997 Winter Simulation Conference*, pp. 594-600, 1997, 7 pages.

Graves, S., et al., "A Dynamic Model for Requirements Planning with Application to Supply Chain Optimization," *Operations Research*, 46(Suppl. 3):535-549, May-Jun. 1998, 15 pages.

Heflin, D., et al., "Simulation modeling and Optimization Using Promodel," *Proceedings of the 1998 Winter Simulation Conference*, pp. 191-197, 1998, 7 pages.

Horngren, C., et al., *Cost Accounting*, 2000, Prentice-Hall, New Jersey, Chapter 14, 40 pages.

Klingener, J., "Combined Discrete-Continuous Simulation Models in Promodel for Windows," *Proceedings of the 1995 Winter Simulation Conference*, pp. 445-450, 1995, 9 pages.

Medaglia, A., "Simulation Optimization Using Soft Computing," Dissertation, North Carolina State University, 2000, 144 pages.

Kucukarslan, I., "An Investigation of Non-Compensatory Decision Strategies Utilized in Transportation Carrier Selection for Outbound Surface Shipments of General Commodity Freight," 1997, The Ohio State University, 259 pages.

Kumar, K., "Technology for Supporting Supply," *Communications of the ACM*, 44(6): 58-61, Jun. 2001, 4 pages.

Padmos, J., et al., "How i2 Integrates Simulation in Supply Chain Optimization," *Proceedings of the 1999 Winter Simulation Conference*, pp. 1350-1355, 1999, 6 pages.

Thierauf, R., et al., *Decision Making Through Operations Research*, $2^{nd}$ Edition, John Wiley & Sons, New York, 1970, pp. 157-207 and 521-537, 70 pages.

Example Direct Shipping Cost Database (cost per 5 lbs.)

|  | 112a | 112b | 112c | | 112d |
|---|---|---|---|---|---|
|  | Distribution Center ("DC") 1 | DC 2 | DC 3 | | DC N |
| 111a  0-5 miles, courier | $10.00 | - | - | ... | - |
| 111b  0-150 miles, domestic ground | $2.25 | $2.00 | $2.00 | | $2.00 |
| 111c  150-1000 miles, domestic ground | $3.00 | $2.50 | $2.50 | | $3.00 |
| 111d  1000-2500 miles, domestic ground | $4.00 | $3.50 | $3.50 | | $4.50 |
| 111e  2500+ miles, domestic ground | $5.00 | $4.50 | $4.50 | | $6.00 |
| 111f  0-3000 miles, domestic next day air | $8.50 | $8.50 | $8.50 | | $8.00 |
| 111g  3000+ miles, domestic next day air | $12.00 | $12.00 | $12.00 | | $11.00 |
| 111h  0-3000 miles, foreign air | - | $19.00 | $19.00 | | $20.00 |

*Fig. 1B*

Example Direct Labor Cost Database

|  | 116a | 116b | 116c | | 116d |
|---|---|---|---|---|---|
|  | DC 1, Processing Lane 1 | DC 1, Processing Lane 2 | DC 2, Processing Lane 1 | | DC N, Processing Lane M |
| 115a  Order Type 1 | $0.50 | $0.50 | $0.75 | ... | - |
| 115b  Order Type 2 | - | $0.75 | $0.75 | | - |
| 115c  Order Type 3 | $1.00 | - | $0.75 | | - |
| 115d  Giftwrapping | - | $2.00 | - | | $2.00 |

*Fig. 1C*

Example Direct Packing Material Cost Database

|  | 120a | 120b | | 120c |
|---|---|---|---|---|
|  | DC 1 | DC 2 | | DC N |
| 119a  Order Type 1 | $0.50 | $0.50 | ... | $0.50 |
| 119b  Order Type 2 | $0.20 | $0.25 | | - |

*Fig. 1D*

Example Estimated Customer Goodwill Cost From Expected Delivery Date Deviation Database

|  |  | 124a<br>Customer 1 | 124b<br>Customer 2 | 124c<br>Customer 3 |  |
|---|---|---|---|---|---|
|  |  | ⋮ |  |  |  |
| 123a | 1 day early | $-5.00 | - | $-1.00 | ... |
| 123b | on-time | - | - | $-0.50 |  |
| 123c | 1 day late | $2.00 | $2.00 | $1.00 |  |
| 123d | 2 days late | $5.00 | $2.50 | $1.00 |  |
| 123e | 3 days late | $10.00 | $3.00 | $2.00 |  |
| 123f | 4 days late | $25.00 | $5.00 | $1.75 |  |
|  |  | ⋮ |  |  |  |

*Fig. 1F*

Example Estimated Customer Goodwill Cost From Expected Order Split Deviation Database

|  |  | 128a<br>Customer 1 | 128b<br>Customer 2 | 128c<br>Customer 3 |  |
|---|---|---|---|---|---|
|  |  | ⋮ |  |  |  |
| 127a | 1 less order split | $-2.50 | - | $-0.25 | ... |
| 127b | expected # of order splits | - | - | $-0.10 |  |
| 127c | 1 more order split | $0.50 | $0.50 | $0.25 |  |
| 127d | 2 more order splits | $1.25 | $0.65 | $0.25 |  |
| 127e | 3 more order splits | $2.50 | $0.75 | $0.50 |  |
| 127f | 4 more order splits | $6.25 | $1.25 | $0.40 |  |
|  |  | ⋮ |  |  |  |

*Fig. 1G*

Example New Order Optimal Allocation Database

|  | DC 1, Processing Lane 1 (132a) | DC 1, Processing Lane 2 (132b) | DC 2, Processing Lane 1 (132c) | ... | DC N, Processing Lane M (132d) |
|---|---|---|---|---|---|
| ⋮ | | | | | |
| 131a 7am-8am EST Order Type 1 | 25 | 15 | 60 | ... | - |
| 131b 7am-8am EST Order Type 2 | - | 30 | 10 | | - |
| ⋮ | | | | | |
| 161c 8am-9am EST Order Type 1 | 25 | 25 | 50 | | - |
| 161d 8am-9am EST Order Type 2 | - | 30 | 20 | | - |
| ⋮ | | | | | |

*Fig. 1H*

Example New Order Actual Allocation Differential

|  | DC 1, Processing Lane 1 (136a) | DC 1, Processing Lane 2 (136b) | DC 2, Processing Lane 1 (136c) | ... | DC N, Processing Lane M (136d) |
|---|---|---|---|---|---|
| ⋮ | | | | | |
| 135a 7am-8am EST Order Type 1 | - | +30 | -5 | ... | - |
| 135b 7am-8am EST Order Type 2 | - | +5 | -5 | | - |
| ⋮ | | | | | |

*Fig. 1I*

Example New Order Allocation Adjustment Formula

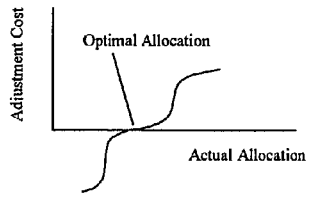

*Fig. 1J*

Example Order Fulfillment Plan Option Comparison (for order by Customer 1 of Type 2 with 2 items)

|  | 140a Direct Shipping Cost | 140b Direct Labor Cost | 140c Direct Packing Material Cost | 140d Delivery Date Customer Goodwill Cost | 140e Order Split Customer Goodwill Cost | 140f Allocation Adjustment Cost | ... | 140z Total Cost |
|---|---|---|---|---|---|---|---|---|
| 139a both items from DC 1, Processing Lane 2; standard shipping | $3.00 | $0.75 | $0.20 | - | - | $0.25 | | $4.20 |
| 139b both items from DC 2, Processing Lane 1; standard shipping | $3.50 | $0.75 | $0.25 | - | - | -$1.00 | | $3.50 |
| 139c item 1 from DC 1, Processing Lane 2; and item 2 from DC 2, Processing Lane 1; standard shipping | $6.50 | $1.50 | $0.45 | - | $0.50 | -$0.35 | | $8.60 |
| ... | | | | | | | | |
| 139d both items from DC 1, Processing Lane 2; Next Day Air shipping | $8.50 | $0.75 | $0.20 | -$5.00 | - | $0.25 | | $4.70 |
| ... | | | | | | | | |

*Fig. 2B* amazon.com.
WELCOME  ADDRESS  ITEMS  WRAP  SHIP  PAY  PLACE ORDER

Please review and submit your order
By placing your order, you agree to Amazon.com's privacy notice and conditions of use.

Important Message
We've changed our checkout process! You'll get all the same features, but fewer pages to view before placing your order. Your default shipping address and other settings are shown below. Use the buttons to make any changes; when you're done, click the "Place your order" button.

Click the "Place your order" button to complete your purchase.    ▶ Place your order

Gift-wrap it for the holidays!
Add Amazon.com gift-wrap or a free gift note.
See our (Gift options)

Shipping to: (Change)
Customer 1
Work
123 Main St.
Seattle, WA 98101

Shipping Options: Learn more about shipping prices and policies

220 {
  ● Standard Shipping from the Seattle DC
      (09/08/xx - $3.50)
  ○ Next Day Air (09/04/xx - $8.50)

230 {
  ○ Standard Shipping + Enhanced Priority Processing
      (09/07/xx - $5.50)
  ⋮
  ○ Next Day Air + Immediate Processing
      (09/03/xx at 10:30 a.m. - $16.50)

240 {
  ○ Standard Shipping from the Atlanta DC
      (09/08/xx - $3.85)
  ⋮
  ○ Standard Shipping from the Disadvantaged Youth
      Processing Lane (09/07/xx - $4.50 + $1.50)

Kenny Loggins Alive Kenny Loggins - DVD
$21.49 - Quantity : 1 - Usually ships in 4 to 6 days
🎁 Gift Options: None (Change)

Order Summary
Items:              $21.49
Shipping & Handling:  $3.50
Total Before Tax:   $24.99
Estimated Tax:       $2.20

Order Total: $27.19

Have a gift certificate or promotional code?
Enter code here:

[      ]
(Apply)
Learn more about gift certificates

Payment Method:
(Change)
Visa: ***-73700
Exp: 06/2003

Click the "Place your order" button to complete your purchase.    ▶ Place your order

*Fig. 2C* amazon.com.  🛒 VIEW CART | WISH LIST | YOUR ACCOUNT | HELP

[ WELCOME | CATHY'S STORE | BOOKS | ELECTRONICS | TOYS & GAMES | COMPUTER & VIDEO GAMES | CARS | KITCHEN & HOUSEWARES ] ⊕ SEE MORE STORES

Your Account > Order History > Order Summary #104-1234567

Order Placed: Sept. 2, 20xx at 02:45 PM PDT     Order Total: $27.19

When will your items arrive?

Not Yet Shipped:
Item 1 will arrive at the Seattle DC from external inventory storage by 5 p.m. on 09/02/xx, and will be behind approximately 100 orders in a queue of orders ready for processing by Processing Lane 3. Order processing will begin at approximately 8 a.m. on 09/03/xx and will be complted by 8:30 a.m. on 09/03/xx. The order will be shipped from the DC at approximately 10 a.m. on 09/03/xx by ABC Shipping.

Delivery Time: 09/08/xx

| Shipping Address: (Change) | Items Ordered | Price |
|---|---|---|
| Customer 1<br>Work<br>123 Main St.<br>Seattle, WA 98101 | 1 of: Kenny Loggins Alive Kenny Loggins<br>  - Availability: 1 in stock<br>  - Gift-wrap and note: None (Change) | $21.49 |
| Shipping Method: (Change)<br>Standard Shipping<br><br>Shipping Option: One shipment when complete order is ready. | | |

Item(s) Subtotal: $21.49
                        Shipping & Handling:  $3.50
                            Total Before Tax: $24.99
                               Estimated Tax:  $2.20

Grand Total for This Order: $ 27.19

*Fig. 2D*

GENERATING CURRENT ORDER FULFILLMENT PLANS TO INFLUENCE EXPECTED FUTURE CONDITIONS

CROSS-REFERENCE TO RELATED APPLICATION

This application is a continuation of co-pending U.S. patent application Ser. No. 11/769,588, filed Jun. 27, 2007, entitled "Generating Current Order Fulfillment Plans Based On Expected Future Orders," which is hereby incorporated by reference in its entirety. U.S. patent application Ser. No. 11/769,588 is a continuation of U.S. patent application Ser. No. 09/965,125, filed Sep. 27, 2001, entitled "GENERATING CURRENT ORDER FULFILLMENT PLANS BASED ON EXPECTED FUTURE ORDERS," now U.S. Pat. No. 7,295,990, which is hereby incorporated by reference in its entirety.

TECHNICAL FIELD

The following disclosure relates generally to a system for placing and fulfilling orders, and more particularly to generating a fulfillment plan for a current order or a potential order so as to enhance the future fulfillment process for expected future orders, such as to minimize the costs that will be associated with fulfilling those future orders.

BACKGROUND

The World Wide Web ("the Web") is a system for publishing information in which users may use a Web browser application to retrieve information (e.g., Web pages) from Web servers and display that information. The Web has also increasingly become a medium used to shop for items, such as products or services for purchase, rent, lease, license, trade, evaluation, sampling, etc. Indeed, thousands of different items may be ordered or obtained on the Web. In many circumstances, a user who plans to purchase an item on the Web can visit the Website of a Web merchant that sells the item, view information about the item, give an instruction to purchase the item, and provide information needed to complete the purchase, such as payment and shipping information.

After receiving an order for one or more items, a Web merchant fulfills that order by determining how and when to provide the items to the purchaser. The order fulfillment process typically used by Web merchants shares some similarities with other item ordering services (e.g., catalog-based shopping, such as from mail-order companies) in which ordered items are shipped to purchasers, such as from a centralized distribution center that maintains the ordered item in inventory. While the order fulfillment process may be as trivial as placing the order in a first-in first-out queue at a single item distribution center used by the Web merchant, other factors may increase the complexity of the order fulfillment process (e.g., having multiple geographically distributed distribution centers that are alternatives for fulfilling the order, having alternative methods of shipping an order, needing to split an order for multiple items into multiple separate groups of items that will each be supplied together, needing to outsource supply and/or delivery of some or all items to third-party vendors, etc.).

Before purchasing an item, it is typical for a user to view information about a product on an "item detail page." The information provided on an item detail page may include such information as the item's name and source, a picture of the item, a description of the item, reviews or ratings of the item, a price at which the item is offered for sale, and one or more controls (e.g., a button) that may be activated by the user to order the item from the Web merchant.

Although shopping at a Web merchant can provide various advantages, shopping at conventional Web merchants also can have certain disadvantages. One cause of some such disadvantages is that merchants providing item ordering services typically have difficulty in accurately identifying when a recipient would receive an order having one or more specified items, for various reasons that are discussed below. For a Web-based merchant, this difficulty may cause inaccurate ordering controls and related information that reflect inaccurate identifications to be displayed to customers.

In addition to potentially causing inaccurate item ordering controls, the difficulties in accurately identifying when a recipient would receive an order also prevents item ordering services from providing to a customer or a recipient immediate feedback related to order fulfillment, regardless of whether the item ordering service is provided by a Web merchant or not. In particular, the difficulties in determining accurate delivery information may cause some item ordering services to make no attempt to provide delivery information that is specific to an order, and to instead use a generic range of time for any order (e.g., "2-14 days"). Even if a merchant attempts to provide some estimate of delivery that is specific to an order, such information will typically be inaccurate and/or imprecise due to the difficulties in determining accurate delivery information. For example, a typical merchant may report that fulfillment of an order for a particular item will take "1-2 weeks" based upon a determination that the item is out of stock. This report may be inaccurate if the item is one that can be resupplied and prepared for shipment in 2 days (and thus unnecessarily prevent a user from buying the item who needs the item to be shipped within 5 days), or if the item is one for which resupply will take more than 2 weeks (and thus unnecessarily disappointing a user who does order the item and needs it to be shipped within 2 weeks). Additionally, this report might be regarded as imprecise because of the wide range of time specified.

One reason that it is difficult for item ordering services to provide accurate order fulfillment information is that many merchants desire to process all of the orders for a given time period (e.g., a day) together, such as to optimize one or more factors after considering all of the orders (e.g., to deliver the most orders possible within a set time period, or to minimize the cost to the merchant of fulfilling all of the orders). Processing all of the orders together may allow the merchant to determine, for example, how best to distribute the orders between distribution centers to accomplish one or more such goals. This method of processing orders has the drawback, however, of not being able to provide the customer with accurate order fulfillment information when an order is placed, thus causing various of the problems mentioned above.

Since accurate order fulfillment information can be critical to some customers and is useful to virtually all customers, however, some item ordering services have attempted various techniques to minimize the inaccuracies and imprecision in the order fulfillment information that is provided to users. For example, some companies may attempt to, at the time an order is placed, estimate when that order will be fulfilled based on a fulfillment process that ignores effects on any other orders (e.g., orders placed later in that same day) and on costs of fulfilling the current order, such as by assigning the order to a distribution center that is closest to the recipient and by expending whatever resources are needed to ship that order by an expected time if possible (e.g., by increasing staffing levels with temporary workers and/or by paying premium inventory prices to quickly acquire an out-of-stock item). However, even if such techniques can minimize inaccuracies and imprecision for a particular order, they suffer from various other problems, including increasing the time needed to fulfill later orders and/or increasing the costs associated with fulfilling those orders. In addition, while such techniques may be able to minimize inaccuracies and imprecision for some orders, they are not typically able to provide accurate delivery information for any given order, as the technique for expending additional resources to attempt to meet a delivery date can fail for a number of reasons (e.g., attempts to quickly acquire an out-of-stock item may fail if third-party sources cannot quickly replenish the item, and even after increasing staffing levels to a maximum amount that is physically possible, those staffing levels may be insufficient to process an existing backlog of orders in an amount of time desired).

In view of these disadvantages of conventional systems for fulfilling orders, it would be beneficial to have a more effective approach to dynamically determining a fulfillment plan that is specific to an order or potential order and that minimizes the negative impact on future orders. In addition, it would be beneficial to be able to accurately determine actual delivery information for an order or potential order, such as to display actual delivery date or time information to a customer before or during the ordering process.

BRIEF DESCRIPTION OF THE DRAWINGS

FIGS. 1A-1L illustrate examples of generating and evaluating multiple fulfillment plans that can be used to fulfill example orders from customers using multiple geographically distributed item distribution centers.

FIGS. 2A-2E are example user interface screens that may be provided to users of a Web-based item ordering service in order to dynamically provide various order delivery information, such as accurate delivery date or time for one or more fulfillment plan options or for a selected fulfillment plan.

DETAILED DESCRIPTION

Figure 1A:
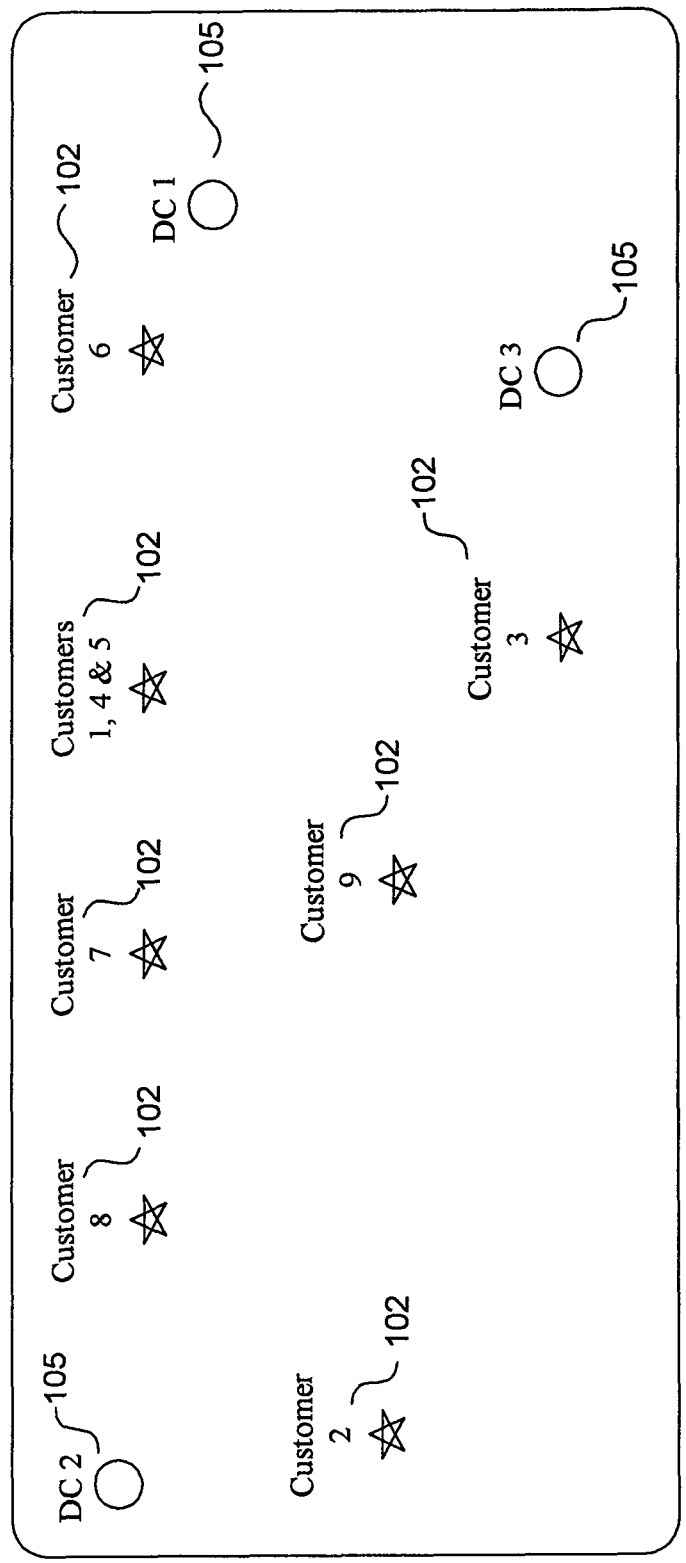

A software facility is described below that assists in dynamically generating an actual fulfillment plan for a current order or a potential order in such a manner as to enhance the future fulfillment process for expected future orders, such as by minimizing the costs that will be associated with fulfilling those future orders and/or by minimizing the time involved in fulfilling those future orders. In some embodiments, actual delivery information based on one or more such actual fulfillment plans will then be provided to a customer, such as by displaying actual delivery date and/or time ("date/time") during the ordering process based on an actual fulfillment plan that will be used to fulfill the order. After an order is placed, the order will be fulfilled using the fulfillment plan that was dynamically selected during or before the ordering process.

In particular, in some embodiments an Order Fulfillment Plan Dynamic Determiner ("OFPDD") system facility dynamically generates, during an ordering process for an actual order, one or more fulfillment plans that can be used to fulfill that order. In other embodiments, before an ordering process has been initiated for a potential order, the OFPDD system generates one or more fulfillment plans that could be used to fulfill that potential order if it is placed. Potential orders can be identified in a variety of ways, and can include any group of one or more items for which it is determined that a user may be interested in placing an order in the future, such as based on the user viewing detailed information about those items or searching for information related to such items. As discussed in greater detail below, upon receiving an indication of a current order (whether an actual or potential order), the OFPDD system first generates a variety of fulfillment plans that could be used to fulfill that current order, and then evaluates each fulfillment plan based on a criteria of interest. A variety of types of criteria can be used to evaluate the effects of using a fulfillment plan to fulfill the current order, as discussed in greater detail below, including criteria that consider the modeled future cost to the item ordering service of fulfilling expected future orders, such as an overall cost of fulfilling all orders during a specified time period that is at least partially in the future.

When using criteria that are based at least partially on the cost of fulfilling orders, the OFPDD system next determines a variety of types of costs that are associated with using a fulfillment plan to fulfill a current order, which in some embodiments can include various combinations of direct costs (e.g., labor, packing material and shipping), modeled customer goodwill costs (e.g., based on delays in delivering this or other orders and/or based on an order being split into multiple groups of items for the purposes of processing and/or shipping), and modeled future costs of fulfilling expected future orders. The OFPDD system then ranks the various fulfillment plans based on the criteria (e.g., based on the lowest associated overall cost), and selects a fulfillment plan to be used and/or selects multiple fulfillment plan options to be presented to the customer. Various information about the selected fulfillment plans can then be provided as appropriate. In addition, in some embodiments only some of the fulfillment plans may be considered for selection, such as if some possibilities are pruned at various times during the generation, cost determination and ranking stages by using heuristics or deterministic manners of identifying those fulfillment plans as being less desirable than others.

As discussed in greater detail below, the disclosed techniques for modeling the future costs of expected future orders include modeling numbers and types of expected future orders (e.g., by item distribution center ("DC") or by individual processing lane per DC, such as by modeling demand by region and by time and day and by modeling expected allocations of resulting orders to DCs or processing lanes), modeling expected future inventory of particular items (e.g., by DC, such as based on current inventory and expected orders and considering future replenishment plans), and modeling expected future order processing capabilities (e.g., by individual processing lane per DC, such as by modeling staffing levels and processing times and considering backlogs and other processing constraints). Based on such modeling, the techniques can be used to provide predictive load balancing so that a decision can be dynamically made on how to fulfill a current order that is optimal or near-optimal with respect to expected future orders. FIGS. 1A-1L, discussed below, provide examples of one technique for selecting fulfillment plans for current orders.

The ability of the OFPDD system to select one or more of the highest ranked fulfillment plans for a current order provides a variety of benefits. For example, if fulfillment plans are selected for current actual orders based on those fulfillment plans minimizing or optimizing modeled future costs of expected future orders, and those selected fulfillment plans are then used to fulfill the orders, the OFPDD system can assist in providing an optimal or near-optimal system for minimizing the overall costs of fulfilling orders while having actual fulfillment plan delivery information available at the time those actual orders are placed. In addition, selecting fulfillment plan options for a potential order provides a variety of additional benefits, such as enabling information to be displayed to the potential customer that indicates accurate delivery information (e.g., actual delivery date/time), so as to motivate the potential customer to place the order. Moreover, by providing information about various options for fulfilling the order, such as to achieve delivery of the order earlier but at a higher cost, the potential customer can choose a fulfillment plan that is best suited to their needs, and the item ordering service is provided the ability to upsell various additional services (e.g., allowing a customer to purchase expedited processing at a DC at a cost that is greater than the cost to the item ordering service of providing the expedited processing).

In order to obtain various information of interest about a fulfillment plan, such as to enable an item ordering service to provide such information to a customer or potential customer, some embodiments provide a Fulfillment Plan Actual Delivery Information Determiner ("FPADID") system facility that analyzes a fulfillment plan in order to determine information of interest, such as to provide actual delivery date/time information for the fulfillment plan or to determine a cost to the customer that is associated with using that fulfillment plan. As discussed in greater detail below, such analysis can be performed in a variety of ways, such as by determining a time at which an order is ready to be processed at a DC (e.g., based on a time to acquire one or more items), determining a time at which an order will begin being processed at a DC (e.g., based on a throughout rate for processing orders, and on an actual backlog or queue of waiting orders or on a predetermined limit or target for a number of orders in the queue), determining a time at which an order will be done being processed at the DC and be ready to be transported to the recipient (e.g., based on a throughput rate, such as by considering actual staffing levels), and/or determining a time for the transporting. The FPADID system can then provide determined information of interest to a requesting client, such as an item ordering service's Web server.

As previously noted, the OFPDD system can generate a variety of fulfillment plans for an order in a variety of ways. For example, in situations in which an order is to be physically transported (e.g., by shipping the order, as contrasted with electronic delivery of an item such as music or software) and in which multiple geographically distributed DCs are available for use in supplying items, the fulfillment plans could include each unique combination of a DC that is able to supply all of the items of the order and of a distinct manner of transporting the order from that DC to the recipient (e.g., via first class mail of the U.S. Postal Service, standard domestic ground-based shipping from private third-party shipping company XYZ, Next Day Air shipping from company XYZ, private courier employed by the item ordering service, etc.). In addition, a variety of other order fulfillment aspects can also be considered in various embodiments in order to generate additional fulfillment plans, including different manners of acquiring ordered items by the DC (e.g., by outsourcing the storage and supply of some or all items to third-party providers), different manners for a single DC to process an order (e.g., by varying a priority used to fulfill the order, or by using differing processing lanes at a DC that can each process certain types of orders and/or items or that can provide varying types of special processing such as giftwrapping), and different manners of supplying an order from a DC to the party responsible for the shipping.

In addition, the OFPDD system can use a variety of types of criteria to evaluate fulfillment plans. For example, in addition to considering the modeled future cost to the item ordering service of fulfilling expected future orders, the criteria to be used could measure the effects of using a fulfillment plan to fulfill the current order by considering the modeled overall cost to the item ordering service of fulfilling all orders during a specified time period that is at least partially in the future, the anticipated average or overall time to fulfill expected future orders or all orders during a specified time period at least partially in the future, the modeled overall costs to customers of fulfilling expected future orders or all orders during a specified time period at least partially in the future, overall customer satisfaction with the fulfilling of expected future orders or of all orders during a specified time period at least partially in the future (e.g., by weighting all customers equally or instead weighting satisfaction values of selected customers more heavily, such as frequent customers or customers having a high net present value based on expected spending and/or associated profits).

When using criteria that are based at least partially on the cost of fulfilling orders, the OFPDD system can additionally model various costs associated with a fulfillment plan in a variety of ways. For example, in some embodiments, customer goodwill costs are assigned to a fulfillment plan based on delays that use of the fulfillment plan causes for the current and/or other orders, such as based on an absolute measure or instead relative to expectations of the customer and/or recipient for the order. Similarly, customer goodwill costs can be assigned in some embodiments based on a number of splits that are caused in the current order and/or other orders that will be processed and/or shipped separately, such as based on an absolute measure or instead relative to expectations of the customer and/or recipient for the order. In other embodiments a variety of other types of customer goodwill costs can be assigned, such as based on how quickly an order is received by the customer, the number of distinct packages that a customer receives for an order, the type of packing material used (e.g., recycled paper or boxes), a location or other factor related to a DC used to fulfill the order (e.g., being in a country associated with substandard wages or from a region different than one with which the customer is a member or identifies with), etc.

In addition to modeling customer goodwill costs, the OFPDD system can model various future costs associated with fulfilling expected future orders in a variety of ways. For example, as discussed in greater detail below, in some embodiments costs are associated with a fulfillment plan based on expected future costs that will be caused by use of this fulfillment plan causing a current increase in an overload of work at a DC, such as to reflect future increased staffing costs to process future orders and/or customer goodwill costs for other orders that will be delayed. In addition, in some embodiments costs are associated with a fulfillment plan based on expected future costs that will be caused by use of this fulfillment plan causing a current increase in an imbalance of inventory at a DC relative to expected demand for that inventory, such as to reflect future increased shipping costs to decrease the inventory imbalance (e.g., by sending inventory between DCs and/or to customers that are farther from a DC having an inventory excess). In some embodiments, costs are also associated with a fulfillment plan based on expected future costs that will be caused by use of this fulfillment plan causing a future exhaustion of inventory at a DC before replenishment of the inventory is scheduled or expected to occur, such as to reflect future costs of expedited or premium inventory replenishment and/or customer goodwill costs for other orders that will be delayed.

In addition, as noted above, in some embodiments the selected fulfillment plans are used to fulfill orders that are placed. Additional information related to fulfilling orders and to obtaining information related to inventory and current orders is available in U.S. patent application Ser. No. 09/921,011, filed Aug. 1, 2001 and entitled "DETERMINING ITEM AVAILABILITY," which is a continuation-in-part of U.S. application Ser. No. 09/919,606, entitled "DETERMINING ITEM AVAILABILITY" and filed on Jul. 30, 2001, both of which are hereby incorporated by reference in their entirety.

For illustrative purposes, some embodiments are described below in which one or more fulfillment plans are generated and evaluated in order to display information to users of a Web-based item ordering service, such as actual delivery date/time information. However, those skilled in the art will appreciate that the techniques of the invention can be used in a wide variety of other situations, such as with non-Web item ordering services, to provide actual delivery information to users in manners other than by displaying it on a Web page, and for reasons other than to enhance orders or reduce costs for an item ordering service.

As an illustrative example of using the disclosed techniques in conjunction with an item ordering service, consider the example illustrated in FIG. 1A. In particular, a geographic area 100 is illustrated in which various customers 102 at varying locations are served by three DCs 105 that are each in different regions of the geographic area. The use of multiple DCs provides benefits not only in providing redundant capabilities (that are of use if a problem occurs at one of the DCs) and distribution of workload among multiple facilities, but also assists in minimizing the cost of providing items to customers, such as shipping costs by reducing the distance needed for the shipping. Due to such considerations, some prior art systems may make decisions on which DC should fulfill an order simply based on a relative location of a customer to a DC.

For example, assume a hypothetical situation in which each of the three DCs provides identical items and services and has the same inventories, workload, and processing capabilities. If so, any order received from Customer 6 will normally be fulfilled by DC 1, since the proximity of the customer to the DC is likely to minimize both the shipping costs (whether billed to the customer or incurred by the item ordering service) and the amount of time that the shipping takes. Similarly, orders from Customer 3 are likely to be fulfilled by DC 3, and orders from Customer 2 are likely to be fulfilled by DC 2. Note that in this hypothetical situation, we are assuming that a customer is ordering items for themselves, and is thus also the recipient of the order. If the recipient differed from the customer placing the order, the location of the recipient would typically be the relevant location.

Conversely, as noted above, the described techniques include considering a variety of different fulfillment plans that can be used to fulfill each order, including considering some or all of the available DCs. Each of the fulfillment plans can then be measured against one or more criteria of interest, such as minimizing the time of delivery to the recipient and/or minimizing the overall cost of fulfilling the current order or of multiple orders. If, for example, the criteria is minimizing the costs of fulfilling the current order, a variety of types of costs that are directly attributable to fulfilling the order can be considered for each of the fulfillment plans. Such direct costs can include, for example, the labor cost at the DC that fulfills the order corresponding to the fulfilling, the cost of packing materials at that DC that are used to prepare the one or more items of the order for shipping, and a cost of shipping the items of the order to the recipient from that DC (e.g., in one or more shipments based on the number of order splits).

Correspondingly, FIGS. 1B, 1C and 1D illustrate examples of such direct costs for different DCs and for different types of orders. Order types can be categorized in a variety of ways, such as a first order type including only single-item orders for items of a specified type and a second order type including multi-item orders for items of any type. In addition, additional types of services (e.g., gift wrapping) and/or processing can also be considered when categorizing order types. In this example embodiment, since each DC can provide each type of order, the fulfillment plans that are considered for an order will include each of the DCs as a possible source of fulfilling the order. In addition, since different types of shipping are typically available and have differing costs, fulfillment plans in this example will also include a specified manner of shipping the order. Moreover, when an order includes multiple items, some fulfillment plans will consider shipping all of the items together from a single DC, while other fulfillment plans will consider shipping some items from one DC and other items from another DC, and other fulfillment plans may consider shipping all of the items from a single DC but in different order splits. In addition, in some embodiments the capabilities within a DC may be considered individually, such as if a DC has multiple processing lanes which can each process specified types of orders.

As a first example, consider an order that is placed by Customer 1. As Customer 1 is most closely located to DC 1, a simplistic assumption could be made that the order would be fulfilled at the lowest cost from that DC. However, considering other factors could cause the overall direct cost to be less from another DC, such as based on DC 1 having high labor costs and/or high packing material costs. For the purposes of this example, assume that the order from Customer 1 is an order of type 1 (e.g., a single book) and that fulfillment plans will be considered for fulfilling the order from each of the DCs using standard ground-based shipping.

The example Direct Shipping Cost database illustrated in FIG. 1B provides various costs for shipping orders from the various DCs using varying manners of shipping. In the illustrated embodiment, the shipping costs for a typical manner of shipping varies based only on a distance from the DC and a weight of the order, although shipping costs in other situations can be calculated in a variety of other ways. In the example embodiment, assuming that the single book and its packing weigh less than 5 pounds and that Customer 1 is 900 miles from DC 1, the direct cost of shipping the order is indicated in the database to be $3.00. Similarly, if the distances of Customer 1 from DCs 2 and 3 are respectively 1,800 miles and 1,500 miles, the corresponding direct shipping costs from those DCs would each be $3.50.

Considering direct labor costs, the example Direct Labor Cost database illustrated in FIG. 1C provides various labor costs for processing orders of different types at the various DCs. In the illustrated embodiment, labor costs are further differentiated based on the one or more processing lanes that will be used at a DC, and thus fulfillment plans in such embodiments can designate the particular processing lanes to be used. As is illustrated, the direct labor costs for this order of type 1 at DC 1 would be $0.50 regardless of whether processing lane 1 or processing lane 2 is used, while processing lane 1 at DC 2 would instead have a cost of $0.75.

Considering packing material costs, the example Direct Packing Material Cost database illustrated in FIG. 1D lists the packing material costs for an order of type 1 to be $0.50 at either DC 1 or DC 2. Thus, the overall direct costs associated with fulfilling the order from Customer 1 using a fulfillment plan that specifies processing lane 1 at DC 1 and standard shipping would be $4.00 ($3.00 for shipping plus $0.50 for labor plus $0.50 for packing material), while fulfilling the order using a fulfillment plan that specifies using processing lane 1 at DC 2 and standard shipping would be $4.75 ($3.50 for shipping plus $0.75 for labor plus $0.50 for packing material). Thus, considering only these costs and only those two fulfillment plans, it would be logical to select the fulfillment plan that designates processing lane 1 at DC 1.

In other embodiments, the direct costs to be considered can be specified and calculated in a variety of other ways. For example, shipping costs could instead be calculated specific to particular items and/or particular customers, and each DC could have its own separate shipping cost database. Shipping costs could also be determined in manners other than distance from the DC, such as based on the recipient's geographical area (e.g., city or state) or by considering shipping routes (e.g., with destinations that are far from normal shipping routes being more expensive regardless of the total distance). Similarly, direct labor costs could also be determined in various other ways, such as by ignoring different processing lanes (e.g., if the lanes are interchangeable or can be dynamically adjusted, such as by moving workers from one lane to another). Packing materials can also be specified in various other ways, such as separately for each processing lane (e.g., if different lanes use different types of materials).

In addition, other types of direct costs could additionally be considered, such as costs associated with receiving, storing and retrieving items, and outsourcing costs for obtaining items from third-party distributors (e.g., if such distributors store the items in lieu of or as a backup to the DCs' inventory). In some embodiments, some fulfillment plans could also include using third-party service providers for some or all of the order processing, thus replacing one or more of the direct costs with a single service cost from that third-party (e.g., supplying an unpacked item to a shipper who will pack and ship the item).

Figure 1E:
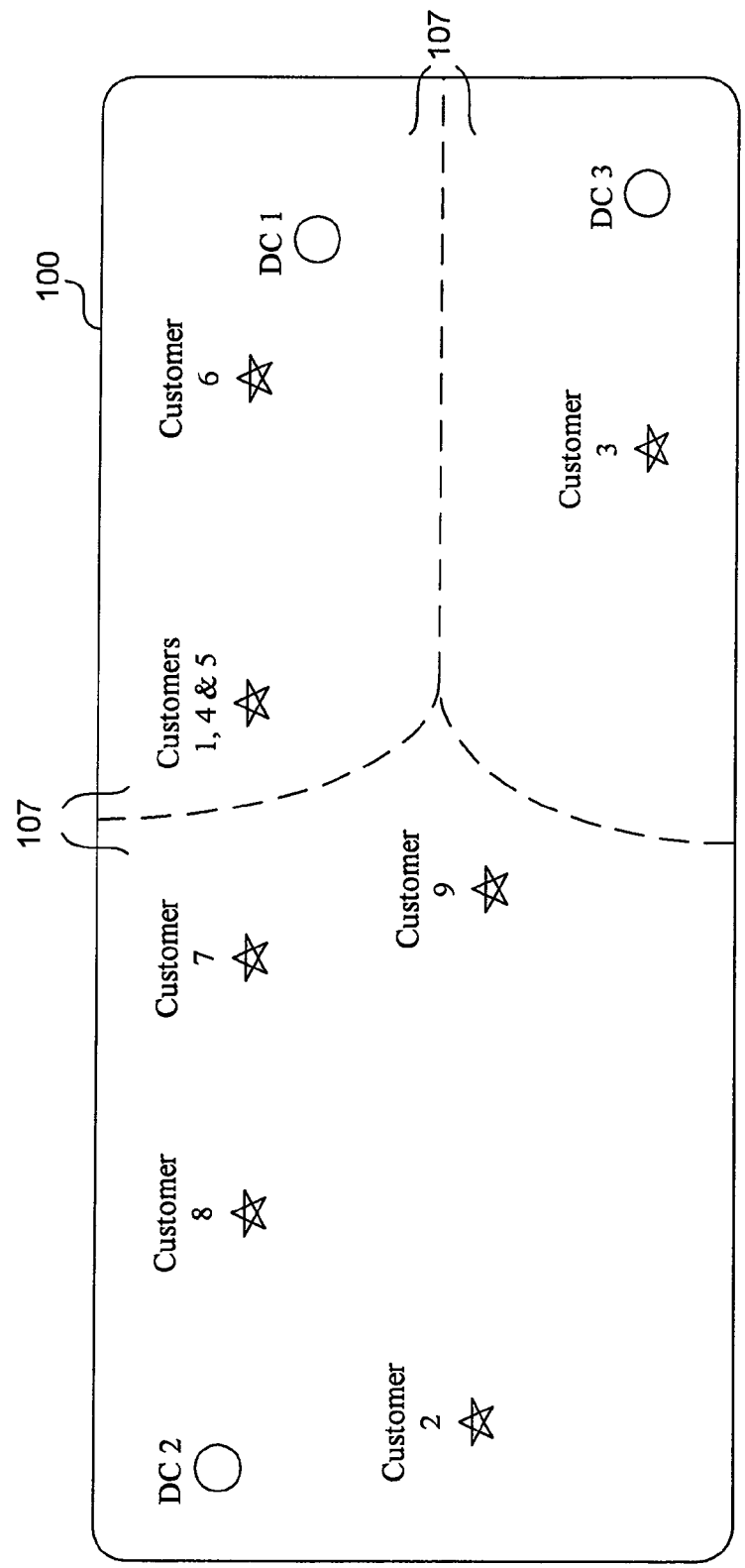

When considering some or all of such direct costs in determining which of multiple geographically distributed item DCs should fulfill orders for various customers, one way to visualize the effect of the direct costs is to divide a geographic area into logical regions associated with each DC. FIG. 1E illustrates one example of how the geographic area 100 could be divided into three regions 107 that correspond to the three example DCs. Some embodiments may further associate each geographic location and/or customer with one of the DCs as a default (or "home") DC, with the default DC typically expected to handle an order unless unexpected circumstances arise (e.g., the default DC becomes overloaded with work and thus would not be able to fulfill the order in a timely manner, or the default DC is out of stock or low on stock for an ordered item while other DCs have sufficient or excess amounts of such items). As discussed below, however, factors other than direct costs are considered when using the disclosed techniques to determine a DC to fulfill an order, such as to cause an order to be moved from a default DC to another DC.

Thus, in some embodiments the criteria used to evaluate and rank fulfillment plans is expanded to include not only direct costs, but also customer goodwill that is affected by the fulfilling of the order. In the illustrated embodiment, customer goodwill costs will be considered based on deviations from customer expectations with respect to delivery date and with respect to number of order splits. Such a deviation from customer expectations presupposes that the customer is provided with information on which to base their expectation, such as before or during the ordering process, or instead has an expectation for such factors from some other source that is identifiable by the disclosed techniques. In at least some of the illustrated embodiments, various information is provided to customers before or during the ordering process that can include actual delivery date and/or an actual number of order splits, as discussed in greater detail below, and in such illustrated embodiments that information can form the basis for the customer expectation.

In other embodiments, other types of customer goodwill costs and/or other types of related customer costs could also be considered. For example, in some embodiments customer value information could also be used when determining how or when to fulfill an order, such as by increasing costs associated with deviations for preferred customers, or by separately adding positive or negative costs for preferred customers to some fulfillment plans (e.g., adding negative costs to fulfillment plans with expedited shipping) to alter the ranking of such plans. Preferred customers could be identified in a variety of ways, such as frequent shoppers, new customers that are expected to have a large number of future orders, and/or new customers that are expected to have high-profit orders in the future (e.g., based on a modeled net present value of the customer).

In the illustrated embodiment, FIG. 1F illustrates an example Estimated Customer Goodwill Cost database based on deviations from expected delivery date. As is shown, in the illustrated embodiment customer-specific goodwill costs are assigned based on deviations from expectations as to the day on which an order is received. In other situations, the information could be represented in a variety of other ways, such as in a manner independent of particular customers, by using time increments other than days, or by using only positive cost values (e.g., modeling costs only for late deliveries). In a similar manner to the database illustrated in FIG. 1F, FIG. 1G illustrates an example Estimated Customer Goodwill Cost database based on deviations from an expected number of order splits (resulting in one or more packages that arrive for each order split separately from the packages for the other order splits). As with the database illustrated in FIG. 1F, the information in the database illustrated in FIG. 1G could in other situations be represented in a variety of other ways.

Using the disclosed techniques, actual delivery date and actual number of packages can be determined for the fulfillment plans when they are generated. Thus, if information is provided to a customer that reflects such actual delivery information, such as before ordering based on a fulfillment plan that is selected as a default unless overridden by the customer, then no goodwill costs will be assigned to at least that fulfillment plan since its actual delivery information will match the customer's expectation. For other fulfillment plans in such a situation, however, a customer goodwill cost may be assigned based on their actual delivery date being later than the actual delivery date of the default fulfillment plan, and thus later than the customer's expectation in the situation described above (unless updated delivery date information can be provided to the user for the alternative fulfillment plan to indicate the later actual delivery date). The customer goodwill costs can also be considered in some embodiments when a fulfillment plan causes changes to actual delivery dates for other orders (e.g., based on a high-priority current order superceding a previously received low-priority order). For the purposes of the current example, we will assume that there are not any customer goodwill costs associated with the generated fulfillment plans for Customer 1.

In some embodiments, the criteria used to evaluate and rank fulfillment plans is additionally expanded to include not only direct costs and/or customer goodwill costs, but also modeled future costs of fulfilling future orders that are affected by the fulfilling of the current order using the fulfillment plan being evaluated, such as to optimize the overall costs for a period of time (e.g., a day) or for a group of orders. In order to model such future costs, in some embodiments projected values for various aspects of the order fulfillment process are determined, and actual values for corresponding time periods are then determined dynamically at the time of selecting a fulfillment plan in order to determine a degree of deviation between expected and actual order fulfillment. Costs are then assigned to any such deviations.

In the illustrated embodiment, FIGS. 1H-1J provide an example of modeling expected future costs of fulfilling orders based on the workloads (or levels of work) at various DCs. By dynamically detecting that a DC is becoming overloaded with work, some of the orders that would otherwise be allocated to that DC for fulfillment can instead be moved to other DCs in an optimal or near-optimal manner (e.g., by selecting those orders to be moved that incur the smallest additional costs). Moreover, by forecasting expected future workloads and capacities, such information can be included when determining whether to move an order to another DC (e.g., thus reducing the likelihood of moving significant numbers of orders to a DC that is temporarily underloaded but is expected to quickly receive a large amount of work).

As an example of dynamically identifying optimal or near-optimal orders for re-allocation from an overloaded DC, consider a situation in which the cost of shipping is a significant component in the overall costs of fulfilling an order. By assigning a cost to fulfillment plans that would use the overloaded DC, some of the items that are within the typical region of the affected DC will be moved to another DC. In particular, the orders will be moved if the assigned cost to reflect the overloading is sufficiently high to overcome the additional shipping cost from the other DC. However, since the shipping costs from the other DC will grow as the customers grow closer to the affected DC, only the orders that are farthest from the affected DC (and thus barely within the region of the affected DC) will initially be identified and re-allocated to the other DC. Since these are the orders that can be re-allocated most cheaply, the result is re-allocation of orders to the other DC at a minimal differential cost that is optimal or near-optimal. Conversely, if DC overloading was not dynamically monitored and was instead only noted at a later time when a significant level of overloading had occurred, it might no longer be possible at that time to identify and re-allocate only the most ideal orders for re-allocation, and instead many or all of the orders in an affected DC's region may need to be re-allocated to another DC, thus greatly increasing the cost of shipping for orders that are close to the affected DC. In order to prevent needless shifting of orders based on limited data, in some embodiments deviation information for one or more of the types of modeled future costs will not be considered until a threshold level of orders (e.g., 1000) have been received.

In the illustrative embodiment, a planning activity is conducted in order to determine expected levels of work that will be handled by each DC at various times over the course of a specified period of time (e.g., a day), such as on a periodic basis or as dictated by current work conditions (e.g., high order volume or user intervention). Such an expected workload determination can be determined in a variety of ways and will typically consider a variety of factors, such as the throughput capacity of the DC (e.g., based on expected staffing levels and projected or historic amounts of work corresponding to such staff levels), expected demand (e.g., for specific items or overall demand) at specified times and in specified locations (e.g., in the region corresponding to a DC), a backlog of existing work that is ready or will be ready for processing during a relevant time period, etc. In the illustrated embodiment, after considering such factors, an optimal allocation of the projected new orders is made to the various DCs as appropriate. Moreover, the allocation is further differentiated in the illustrated embodiment to the various processing lanes at the DCs, such as by considering staffing levels and types of orders that can be processed for the various processing lanes.

FIG. 1H illustrates an example New Order Optimal Allocation database that provides optimal new order allocations for the processing lanes of the various DCs during 1-hour time frames of an overall time period such as a day. In the illustrated embodiment, the optimal order allocations are represented as absolute numbers of orders, but in other embodiments could instead be represented in other manners such as a percentage of all new orders that arrive during that time frame. In generating such optimal allocations, factors such as backlog and capacity can be considered rather than merely projecting expected demand in a DC's typical region. For example, considering a factor such as a backlog of existing orders can produce a reduction in what would otherwise be a processing lane's optimal allocations of new orders for one or more time frames so that the backlog can be reduced, while considering a factor such as capacity can produce an increase in the optimal allocation of new orders that are assigned to a processing lane for a time frame due to a planned increase in staffing during that time. In addition, by generating such optimal allocations for specific time frames of a specific time period, time-of-day, day-of-week, day-of-month, and day-of-year considerations can also be included. In other embodiments, the optimal allocations could be represented in other ways, such as for other types of time periods, or in a manner that is non-optimal (e.g., such as merely preferred). In addition, if capacities or differences between different processing lanes can be dynamically altered to reflect demand, new order allocation projections in such embodiments may not be differentiated by processing lane.

Various other factors can also be considered in other embodiments when constructing such an optimal allocation breakdown, such as a projected mix of types of orders to be handled by that processing lane (e.g., receiving a high level of types of orders for a time frame that require less processing, such as single-item orders or orders that do not require specialized services), an ability to increase capacity at one or more processing lanes if needed (e.g., by bringing in temporary staffing assistance) and/or an ability to dynamically control the flow of new orders for some or all types of items or orders (e.g., by listing items as temporarily unavailable, or by using dynamic pricing to increase or decrease demand, such as by offering free shipping or altering a normal price of an item). Similarly, if some items are processed in different manners than others, such as via third-party item providers that can supply and ship an item independently of a DC or can supply items to a DC, the optimal allocation of new orders could be altered to reflect the availability of such services. Alternatively, such alternative processing services could be explicitly modeled (e.g., similarly to a processing lane) and could have their own assigned optimal allocations.

The optimal allocation information illustrated in FIG. 1H provides one technique for determining a degree of overloading of a DC processing lane by determining how actual allocations differed from the optimal allocations. By assigning costs to fulfillment plans that use overloaded processing lanes, those fulfillment plans are less likely to be used and some new orders are shifted to other processing lanes (whether at that DC or at another DC). In the illustrated embodiment, a determination is made of current overloading by analyzing an actual number of new orders that were allocated to a DC processing lane during a previous time window (e.g., 8 hours or 24 hours) and computing a differential between the actual allocations and the optimal allocations for that same time period.

FIG. 1I illustrates results of such an allocation differential computation. For example, in the illustrated embodiment, processing lane 2 of DC 1 had an allocation differential of receiving 30 extra new order allocations during the 7 a.m. to 8 a.m. time period for orders of type 1, while processing lane 1 of DC 2 had five less orders of type 1 during that same time period than was optimal. In the illustrated embodiment, an additional cost will thus be assigned to a fulfillment plan that includes processing lane 2 of DC 1 based on the allocation differential, thus re-directing some of the orders that would otherwise be allocated to that processing lane over the next time period.

The manner in which a cost is assigned to such a differential can be determined in various ways. In the illustrated embodiment, an adjustment formula is associated with each type of modeled future cost, such as the example New Order Allocation Adjustment Formula illustrated in FIG. 1J. The illustrated adjustment formula is constructed so as to allocate only very small costs to small deviations in allocations, but to increase the allocated costs at an exponential pace as the deviations grow. The illustrated adjustment formula is also structured to exponentially slow the growth of the allocated costs as the deviations grow increasingly large, such as to reflect a ceiling on an amount of assigned cost for this factor. A variety of other types of functions (e.g., constant value, linear growth, non-continuous, etc.) could instead be used in other embodiments. In addition, while the illustrated adjustment formula includes negative costs associated with negative differentials (i.e., underloading of a processing lane), in other embodiments only positive cost values may be used. Moreover, in other embodiments adjustment formulas could be specified in other manners, such as having an adjustment formula specific to each DC or processing lane.

Each of a variety of other order processing aspects could be similarly modeled and have corresponding costs assigned to deviations from optimal levels. For example, in some embodiments inventory is placed at DCs based on expected demand for such inventory in the region typically served by that DC. However, if demand for such inventory is different than expected, an imbalance will occur with respect to the level of inventory on hand and the inventory needed to fulfill future orders over a specified time period. Rather than incurring the cost of moving inventory between DCs, costs can instead be assigned to fulfillment plans that include such a DC to represent the inventory imbalance, such as to artificially correct the inventory imbalance by shifting additional orders to or from the DC as appropriate.

Similarly, in other embodiments inventory levels and order projections can be used to determine that a DC will exhaust a supply of inventory for an item in the future before replenishment of that item inventory is scheduled to occur. Such a situation can cause orders that occur after the inventory exhaustion to be delayed (and thus have increased customer goodwill costs) or cause additional inventory replenishment fees for such orders (e.g., based on expedited replenishment or on acquiring such items from a premium cost third-party provider). In some embodiments, if allocating an order to a DC will cause such an inventory exhaustion problem in the future, an additional cost is assigned to fulfillment plans that would currently assign the order to that DC, either for any such order or instead only for orders for which the DC is not the default DC. Assigning such a current additional cost can prevent a variety of disadvantageous situations from occurring, such as currently moving an order from a first DC that has sufficient inventory to a second DC at which the inventory will be exhausted in the future (e.g., based on a slight cost difference due to a temporary overload at the first DC), but then later having to fulfill all orders for such inventory from the first DC at even greater cost after the second DC has exhausted its inventory. Conversely, if inventory levels will allow only one order for an item to be filled, and a later order would be able to be fulfilled more cheaply than a current order for the item (e.g., because it is near the DC having the one remaining item and the current order is in the region for another DC), assigning such an inventory exhaustion cost to the current order may keep the current order at its current DC even if its fulfillment will be delayed and allow the later order to be fulfilled.

Thus, by assigning costs to various aspects of order fulfillment based on modeled future costs of future orders, a determination can be made dynamically at the time an order is placed that is optimal or near-optimal with respect to minimizing the future cost of fulfilling future expected orders.

FIG. 1K illustrates an example comparison of multiple order fulfillment plans for a current order from Customer 1 of order type 2 that includes two items, with the comparison considering various direct cost, estimated customer goodwill cost, and modeled future costs for fulfilling future orders. As is shown, fulfillment plans include shipping both items of the order from processing lane 2 of DC 1 or from processing lane 1 of DC 2 using standard shipping. In addition, other fulfillment plans include splitting the order (e.g., between DCs 1 and 2) and using other manners of shipping (e.g., Next Day Air). In other embodiments, fulfillment plans including various other factors could additionally be considered, such as customer value and/or expedited processing (e.g., for which the customer will be charged). In the illustrated example, despite the fact that Customer 1 is located in the region typically associated with DC 1 (and has lower shipping costs from DC 1), the fulfillment plan that is selected will fulfill the order using processing lane 1 of DC 2. That fulfillment plan has a lower overall cost based on an allocation adjustment cost for that fulfillment plan to reflect that processing lane 1 of DC 2 is currently underloaded. In other embodiments, information about multiple fulfillment plans for a current order could be stored in a variety of ways, such as by using a multi-dimensional table that includes relevant factors (e.g., different DCs or DC processing lanes, different manners of shipping, different manners of acquiring items, etc.) along each of the dimensions, with one or more possible values for each relevant factor.

Figure 1L:
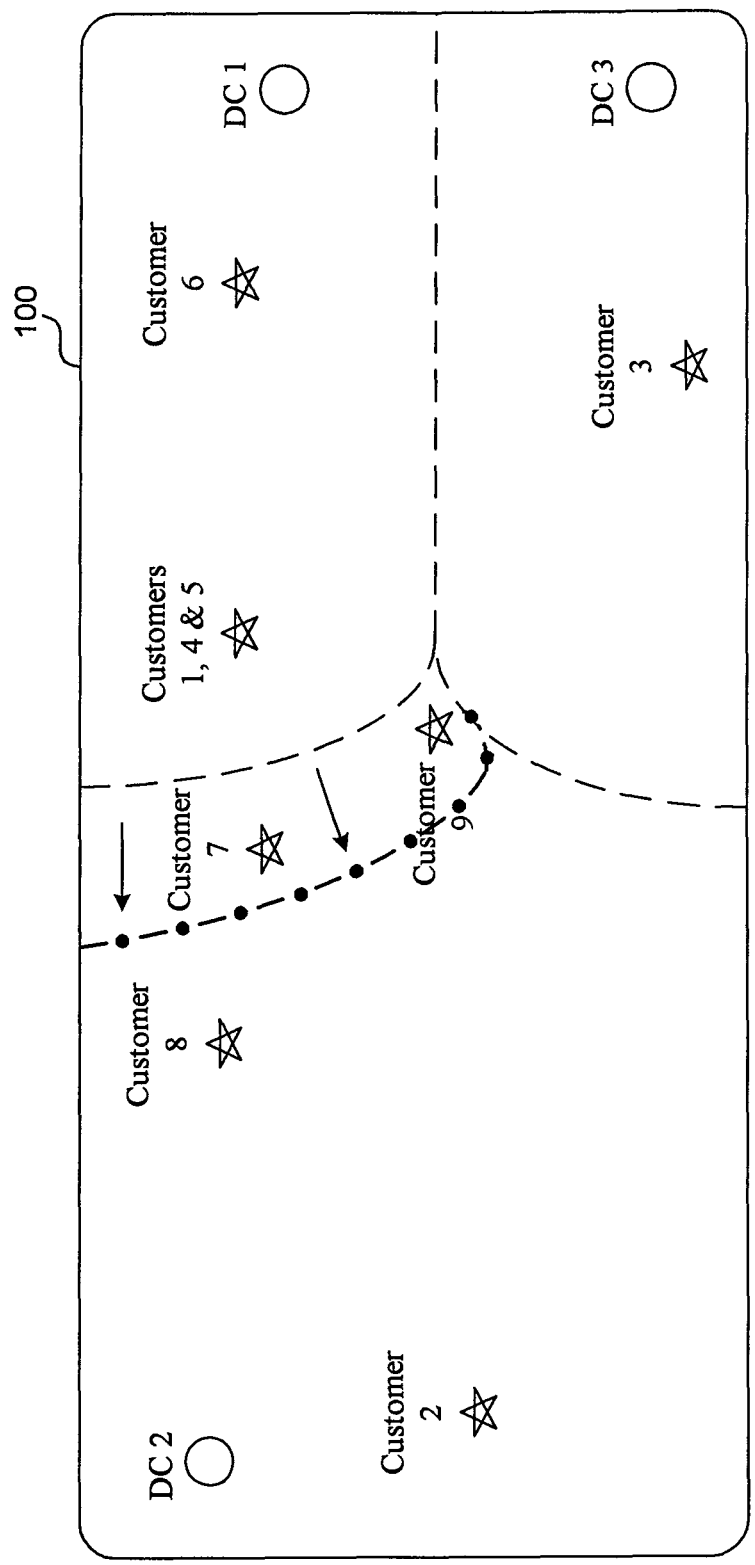

FIG. 1L illustrates one manner of conceptualizing the effect of modeling additional factors other than direct costs, such as customer goodwill costs and/or modeled future costs of fulfilling future orders. In particular, FIG. 1L illustrates a temporary adjustment to the default regions that were illustrated in FIG. 1E. By modeling these other costs in a dynamic manner, the boundaries of the regions shift to include or exclude additional orders as appropriate. Thus, for example, the illustrated example region associated with DC 1 has been temporarily adjusted outward to now include a variety of additional geographic locations and customers, including Customer 7 and Customer 9. This may be caused by a variety of reasons, such as an overloading of DC 2 (or an underloading of DC 1), an inventory imbalance of DC 1 having an excess for one or more items, or a determination that DC 2 will exhaust inventory of an item in the future before replenishment is scheduled to occur (e.g., shrinking DC 2's region so that a current order from Customer 7 will not be currently fulfilled by DC 2, thus allowing a later order with lower associated fulfillment cost, such as an order from Customer 2, to be fulfilled).

In addition to being able to select fulfillment plans based on criteria of interest, the disclosed techniques additionally provide other benefits. For example, being able to determine a fulfillment plan to be used to fulfill an order before or during the ordering process allows an item ordering service to provide additional useful information to a customer, such as actual delivery date/time information for the order, thus increasing the likelihood that customers will use the item ordering service more frequently or in lieu of other ordering services. In addition, by generating multiple fulfillment plans for an order or a potential order and determining differential costs associated with such options (e.g., based on cost that would be charged to the customer or cost incurred by the item ordering service), the item ordering service can provide options to the customer for having an order fulfilled in varying manners, such as at an extra charge to the customer based on the option (e.g., at a for-profit cost that is greater than the differential cost of that option). Moreover, as noted previously, by selecting fulfillment plans based on a variety of costs, additional functionalities can be provided to a customer, such as to allow a customer to purchase expedited processing of an order at a DC at an appropriate cost (e.g., a cost greater than the cost incurred by the delay of other orders, such as the goodwill cost associated with those delayed orders) or to allow a customer to specify a particular DC at which an order will be fulfilled.

Figure 2A:
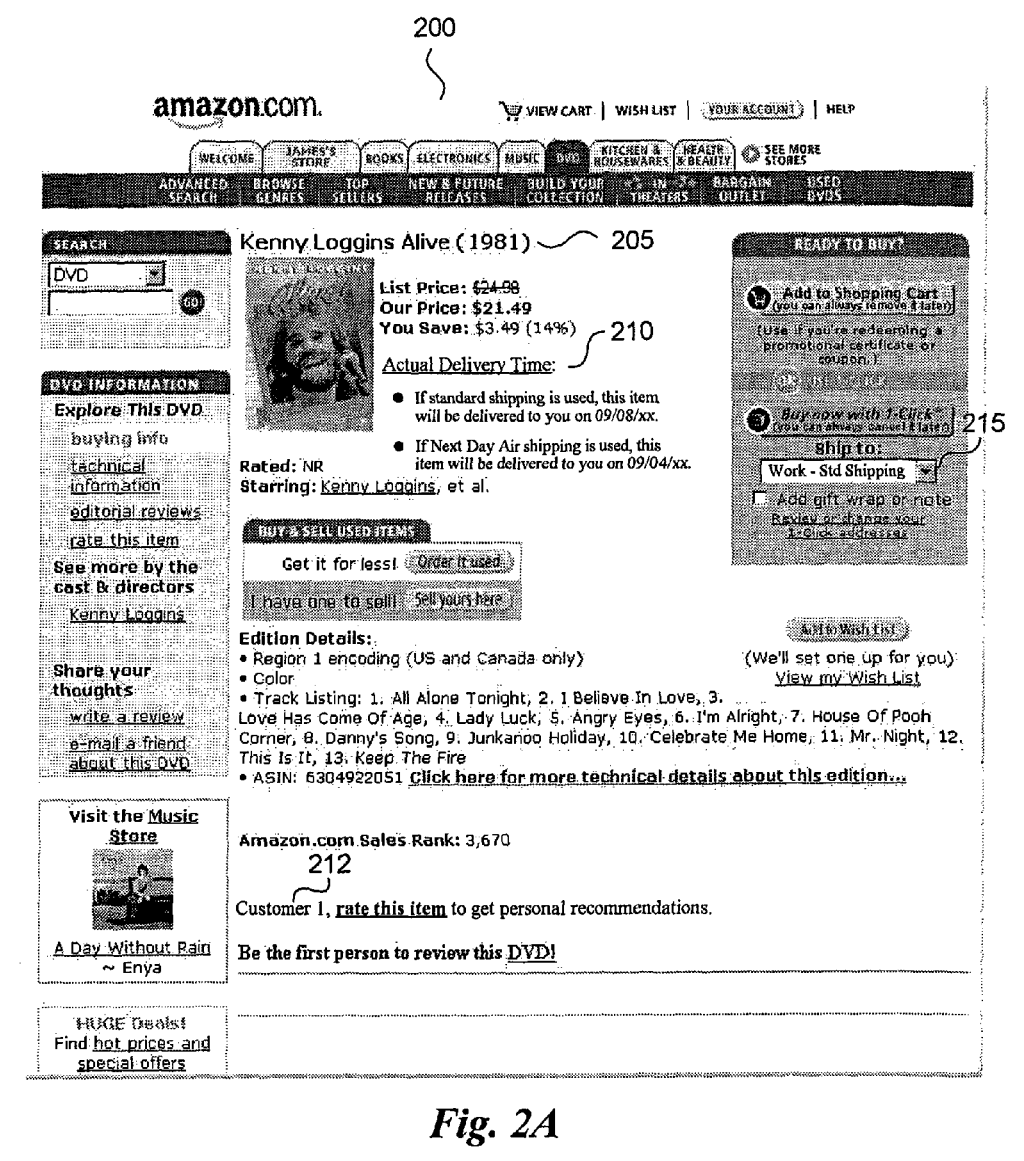

FIG. 2A provides an example of an item description page 200, such as may be provided by an item ordering service (e.g., Web merchant Amazon.com) to a user that is a potential customer. The illustrated Web page provides a variety of details about an item 205 that is available for ordering (in the illustrated case for purchase). In addition to various item ordering controls, the illustrated item information includes an indication 210 of actual delivery date/time information related to a potential order that may be placed for this item. In particular, before an order for the item has been placed, a determination is made in the illustrated embodiment to provide information about this item (e.g., based on a selection of the item as the subject of a potential order, such as from an indication to display the item from a user). Upon receiving the user indication and before displaying the illustrated Web page, multiple fulfillment plan options are then determined for a potential order for this item, and one or more of the fulfillment plan options are selected based on the techniques disclosed above. Information about the selected fulfillment plan options can then be displayed as part of the Web page.

In the illustrated embodiment, information is provided with respect to two different fulfillment plan options, one based on a fulfillment plan selected among those using standard shipping and another based on a fulfillment plan option selected among those using Next Date Air shipping. For each of the fulfillment plan options, actual delivery date/time information is calculated and is presented to the user. If the user then chooses to order this item, the order will be fulfilled by using the fulfillment plan on which the actual delivery date information was based. For example, if the user orders the item using standard shipping, the first-listed fulfillment plan will be used to deliver the item to the user on the listed actual delivery date of 09/08/XX. In the illustrated embodiment, such an order may be placed in various ways, such as by the customer using the displayed 1-Click ordering option 215 that is predefined to use standard shipping.

A variety of other types of actual order fulfillment information could be similarly illustrated in other embodiments, and the manner in which various information is presented could vary in a variety of ways. For example, in the illustrated embodiment, information is presented for multiple fulfillment plan options based on different types of shipping. In other embodiments, information on different fulfillment plans could be presented based on other criteria, or instead information on only a single fulfillment plan may be presented (e.g., a fulfillment plan selected in order to correspond to a default ordering method for the customer, such as the default 1-Click ordering method that is initially displayed). In addition, a variety of information other than actual delivery date/time can also be displayed, such as various details of the fulfillment plan (e.g., which DC and/or which processing lane will be used for the processing, a time at which the order will begin to be processed at the DC, a time at which the order processing at the DC will be completed, a time at which shipping from a DC will begin, a particular shipper and/or shipping route to be used, etc.).

Figure 2B:
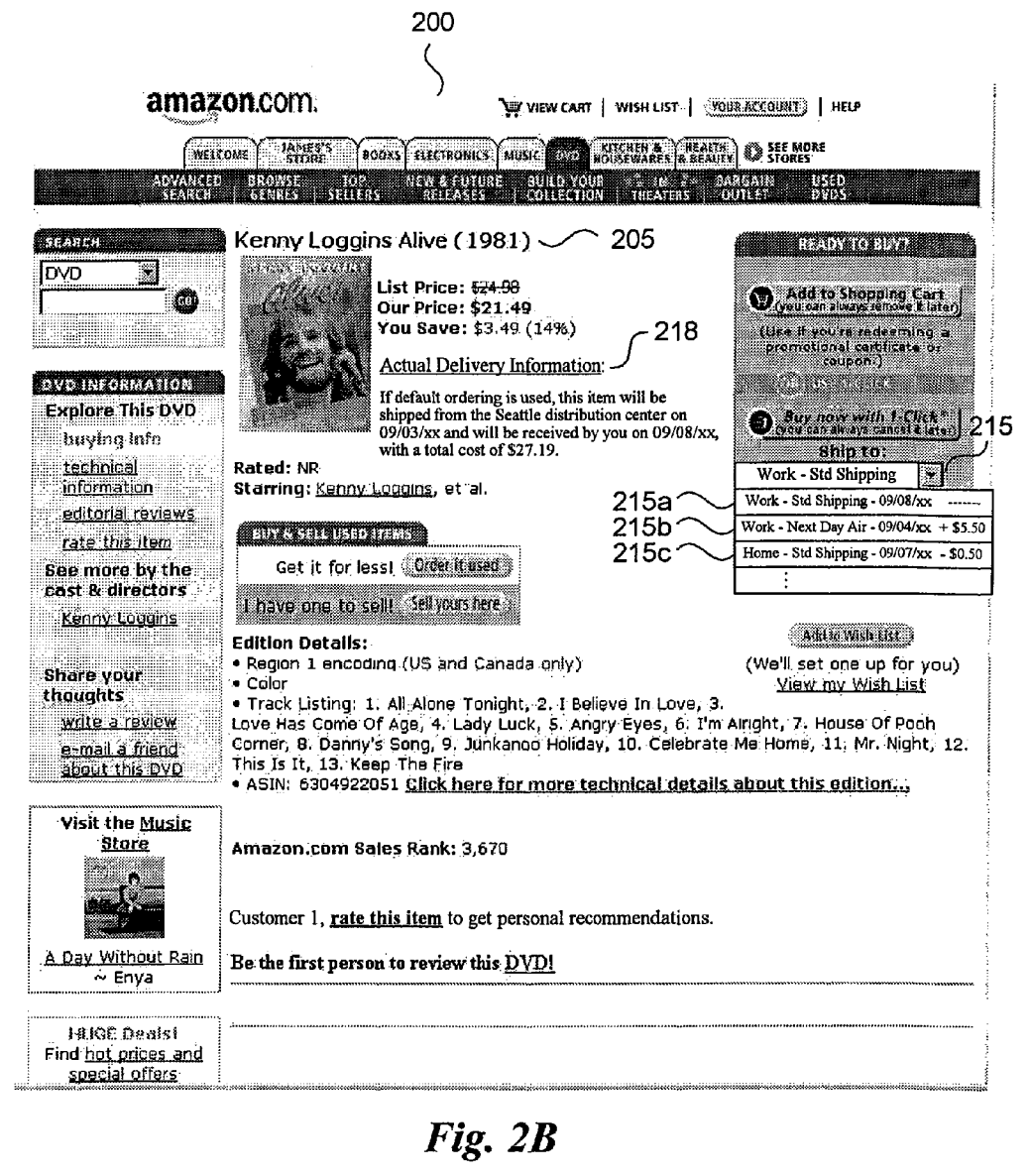

FIG. 2B provides an example of another manner in which information about fulfillment plan options can be provided to a potential customer before an order is placed. In particular, in the illustrated embodiment the customer has selected a drop-down menu 215 corresponding to various defined ordering options 215a-215c for the user. In the illustrated embodiment, additional information is provided for each defined ordering option based on a fulfillment plan that would be selected for use if that ordering option is used to order the item, such as actual delivery date/time and total cost to the customer. As such ordering options can each specify a variety of information relevant to the fulfillment plan used (e.g., recipient, manner of shipping, etc.), the corresponding fulfillment plans will be selected in accordance with such specified information.

In addition, in the illustrated embodiment various actual delivery information 218 is displayed to the user based on the initially selected default 1-Click ordering option. The actual delivery information includes not only an actual delivery date, but also details about the DC that will fulfill the order and about intermediate order fulfillment processing. In some embodiments, such information will be dynamically updated to reflect a new ordering option that is selected by the user and/or to reflect any relevant information specified by the user with respect to the potential order (e.g., a recipient or manner of shipping to be used).

The information that is displayed in a pre-ordering situation can vary in other embodiments. For example, in some embodiments multiple fulfillment plan options may be displayed to the user along with controls to allow the user to select a fulfillment plan option, and if so the user-selected fulfillment plan option would be used to fulfill an order placed by the user. In addition, in the illustrated embodiment the fulfillment plan information that is displayed corresponds to an order for the single displayed item. In other embodiments, information from one or more fulfillment plan options could be displayed that corresponds to multi-item orders, such as by combining the currently displayed item with other recently ordered items so as to be treated as a single multi-item order.

FIG. 2C provides an example of various fulfillment plan option information that can be provided to a customer during the ordering process. In particular, in the illustrated embodiment the customer has previously indicated to begin the ordering process for the item 205 (e.g., by adding the item to the customer's shopping cart), and the customer is now being prompted to select one of multiple options 220 for fulfilling the order. For each displayed option, actual delivery information and cost information is provided based on a fulfillment plan that will be used if that option is selected. In addition, the order summary information 225 and 235 on the Web page in the illustrated embodiment reflects the currently selected option. In some embodiments such information will be dynamically updated to reflect a new selection interactively made by the customer.

In the illustrated embodiment, a variety of additional options 230 are also provided to the customer that reflect additional functionality available to the user at additional cost, such as based on additional cost to the item ordering service in order to provide the additional service (e.g., a customer goodwill cost for another customer's order being delayed if the current customer selects priority processing). For example, the first option 230 includes processing at the DC using an enhanced priority (e.g., to move the order at least partially up a queue of waiting orders or to guarantee that processing begins within a certain amount of time after the order is received), resulting in an actual delivery date that is a day earlier than that shown for the default selected first option 220 but at an additional cost of $2.00. Similarly, the last option 230 allows the user to combine immediate processing at the DC with Next Day Air shipping for the earliest possible actual delivery date/time, but at a premium price. As is also shown in the options 230, in some embodiments actual delivery date/time information that is provided can vary in specificity, such as the first option 230 providing actual delivery time information that indicates a specific day and the last option 230 providing actual delivery time information that further indicates a time-of-day for a specific day.

In addition, in some embodiments information for additional options 240 can be provided, such as to allow the user to select specialized services and/or specific fulfillment plans. For example, the first option 240 allows the user to have the order fulfilled by the Atlanta DC rather than the Seattle DC, with the actual delivery date/time unchanged but at an additional cost of $0.35. The last of the options 240 indicates a fulfillment plan option that corresponds to a hypothetical charity "Disadvantaged Youth," with the cost of using that fulfillment plan option including both a $4.50 charge imposed by the item ordering service and an additional $1.50 charitable donation. A variety of other types of fulfillment options could similarly be provided.

FIG. 2D provides an example of providing actual delivery information at yet another time in the ordering process, in this case being near the end of the ordering process. In particular, in the illustrated embodiment the user has provided an indication of completion so as to place the order, and an Order Summary Web page is presented to the customer immediately subsequent to that indication. In a similar manner to the other Web pages, the illustrated Web page includes information about actual delivery date/time, as well as various other details about the selected fulfillment plan that will be used. In the illustrated embodiment, a variety of details about the intermediate order fulfillment processing is displayed. Such information could in other embodiments include explanations for unusual processing, such as orders being delayed due to weather or to other circumstances. In the illustrated embodiment, information about fulfillment plan options is not displayed since the user has already indicated to place the order, but in other embodiments such options could still be provided after an order is placed if the order fulfillment process could still be changed (e.g., based on an intervention by the customer within a limited period of time, such as to cancel or change the order).

In other embodiments, a variety of other types of fulfillment plan information can similarly be displayed in these and at other times in the ordering process. In addition, in some embodiments a user can later return after the ordering process has been completed and receive actual fulfillment plan information that provides a current status of the stage of the order fulfillment process that is underway, about previous actions that have already been performed as part of the order fulfillment process, and/or about any changes to the fulfillment plan (e.g., an offer to delay the actual delivery date/time by a day in exchange for a fee credit or other incentive, such as to allow the item ordering service to process another order first based on a premium fee).

Figure 2E:

FIG. 2E provides an example of an item description page that is similar to the page illustrated in FIG. 2A, but that includes different actual delivery date/time information. In particular, since such fulfillment plan information is in the illustrated embodiment dynamically determined before displaying each such Web page, each Web page will be customized to the current circumstances. Thus, if Customer 1 did not place an order for the item 205 when the item description page 200 was originally displayed and later returned to that same page, a new Web page will be generated based on new determined fulfillment plans, and thus information such as actual delivery date/time information may have changed. In the illustrated embodiment, the Web page illustrated in FIG. 2E is generated and displayed after the Web page illustrated in FIG. 2A, but is provided for a different customer 212, Customer 2. In the example shown, Customer 2's proximity to a DC that will be used to fulfill his potential order allows the actual delivery date/time information to be earlier than that previously presented to Customer 1 on the Web page 200.

The example of Customer 1 later returning to a Web page for the same item 205, whether the same Web page or a newly generated Web page, raises an issue with respect to the validity of fulfillment plans and their corresponding information varying over time. In particular, for situations in which one or more fulfillment plans are generated but are not immediately used to fulfill an order, some or all of such fulfillment plans may eventually become invalid (e.g., due to a change in capabilities at a DC) if attempted to be used at a later time.

Similarly, if information corresponding to such fulfillment plans was presented to a user at the time of generation, such as based on an assumption of immediate or near-term use of the fulfillment plan, that previously presented corresponding information may become inaccurate at a later time with respect to a then-current use of the fulfillment plan (e.g., due to new actual delivery date/time information that differs from the previously presented information and/or due to new associated cost information that differs from previously presented cost information so as to reflect recent cost changes). Thus, in some embodiments, when previously generated fulfillment plans are considered for later use, additional processing may be performed at that time to determine whether the fulfillment plans are still relevant, to re-evaluate the fulfillment plans in order to select a new fulfillment plan that is currently optimal, and/or to update actual delivery information associated with the fulfillment plans. In other embodiments, such delays in use of a fulfillment plan may be handled in other manners, such as by associating expiration times with fulfillment plans and/or their corresponding information, and/or determining at the time of generation how the fulfillment plan and/or its corresponding information may be altered over time to reflect an actual time of use.

Figure 3:
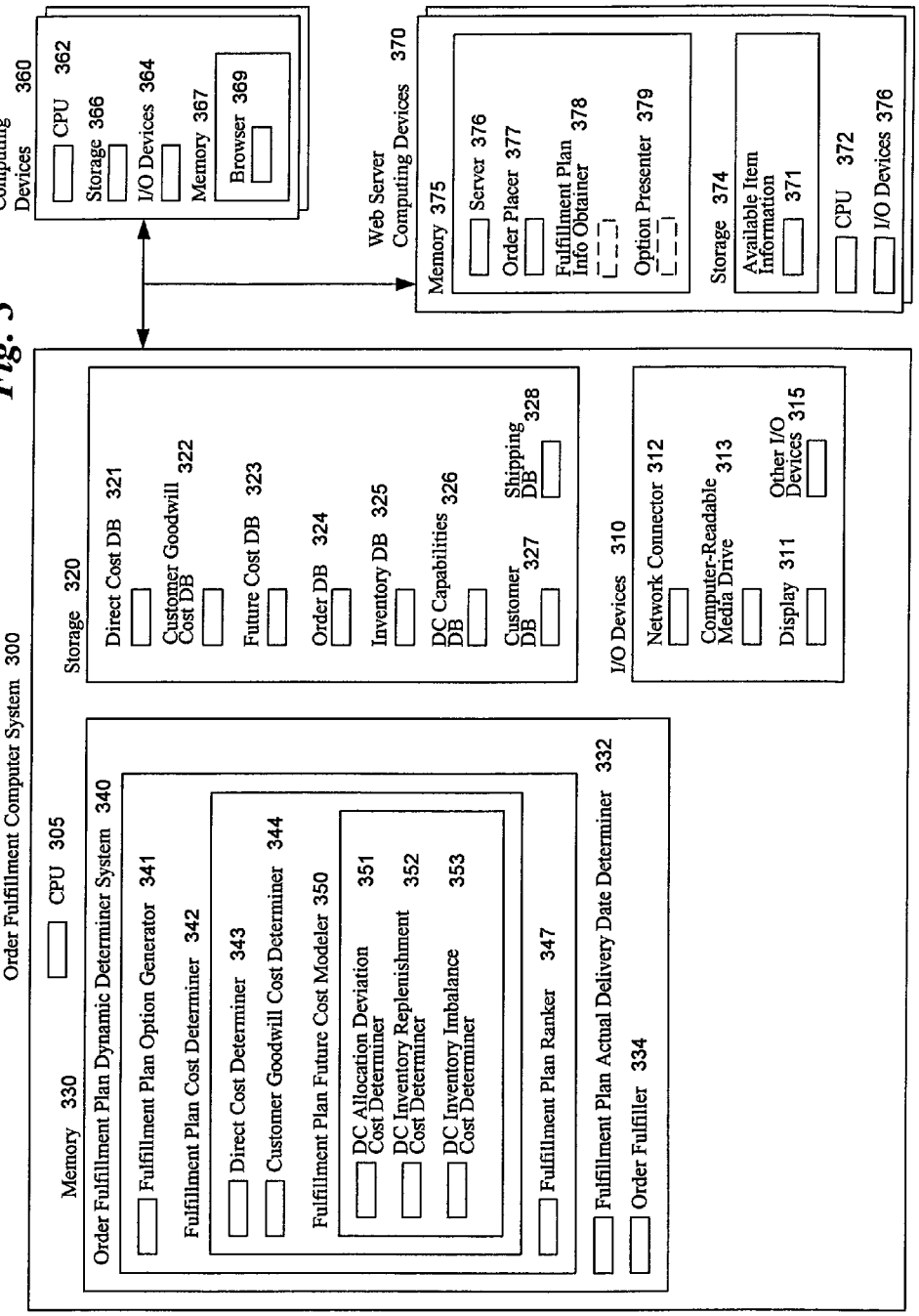
FIG. 3 is a block diagram illustrating an embodiment of a system for determining and evaluating fulfillment plans for fulfilling an order or potential order, and for determining various actual delivery information for a fulfillment plan.

FIG. 3 illustrates a computer system 300 suitable for executing components to dynamically select fulfillment plans in accordance with a specified criteria and to determine information about such fulfillment plans, such as actual delivery date/time information. FIG. 3 also illustrates various client computing devices 360 from which users can request and receive various Web pages and other information, such as from illustrated server computing devices 370 for one or more item ordering services. Such users can thus receive information about items, which can include information about fulfillment plans available to be used to fulfill orders for the items, and can interactively place orders that will be fulfilled based on such fulfillment plans.

The order fulfillment computer system 300 includes a CPU 305, various I/O devices 310, storage 320 and memory 330. The I/O devices include a display 311, a network connection 312, a computer-readable media drive 313, and other I/O devices 315. Several components are executing in memory, including an embodiment of an Order Fulfillment Plan Dynamic Determiner system 340, a Fulfillment Plan Actual Delivery Date Determiner system 332, and an order fulfiller system 334.

The Order Fulfillment Plan Dynamic Determiner system 340 is capable of receiving a request to determine information about an order or a potential order, such as to generate one or more fulfillment plans that are evaluated and selected based on a default or specified criteria. For example, as previously indicated, a Web server item ordering service may request such fulfillment plans before displaying information about items available for order or as part of the ordering process (e.g., in order to provide options or relevant information to a customer) and/or in order to complete the ordering process for an order that was just placed, such as with a confirmation or summary Web page that indicates relevant information about the fulfillment plan for the order.

Upon receiving a request to provide information about one or more fulfillment plans, a Fulfillment Plan Generator component 341 of the system 340 generates multiple fulfillment plans for the indicated order. In so doing, the component 341 may access and use a variety of accessible information, such as information stored on storage 320 and/or on remote locations accessible over a network. For example, when determining fulfillment plans, the component 341 may retrieve and use information about DC capabilities, DC inventories, customers, and various shipping capabilities, such as from databases 325-328 on storage. In some embodiments, some of the fulfillment plans may be immediately pruned based on a determination of inferiority to other fulfillment plans, such as based on the criteria in use.

Any non-pruned fulfillment plans are then supplied to the Fulfillment Plan Cost Determiner component 342 in order to determine various types of costs associated with the use of those fulfillment plans. In the illustrated embodiment, the component 342 contains sub-components that include a Direct Cost Determiner component 343, a Customer Goodwill Cost Determiner component 344, and a Fulfillment Plan Future Cost Modeler component 350. The Direct Cost Determiner component determines various direct costs associated with using a fulfillment plan, such as based on various direct cost information available in one or more direct cost databases 321 on storage. The Customer Goodwill Cost Determiner component assigns various customer goodwill costs to a fulfillment plan, such as based on information in one or more Customer Goodwill Cost databases 322 on storage. The Fulfillment Plan Future Cost Modeler component models future costs that will be associated with fulfilling projected future orders if this fulfillment plan is used to fulfill the current order, such as based on information from various Future Cost databases 323 on storage.

In the illustrated embodiment, the Fulfillment Plan Future Cost Modeler component models future costs of three types by using three sub-components. Those sub-components include a DC Allocation Deviation Cost Determiner component 351, a DC Inventory Replenishment Cost Determiner component 352, and a DC Inventory Imbalance Cost Determiner component 353. The DC Allocation Deviation Cost Determiner component assigns a cost to the fulfillment plan based on any deviations from expected order allocations at the DCs and/or processing lanes to be used for the fulfillment plan. The component may retrieve and use various information for such a determination, including actual order information from an order database 324 on storage and information about expected and/or optimal order allocations (not shown), such as information that is dynamically computed or was previously computed in a planning phase and is accessible on storage or in memory. The DC Inventory Replenishment Cost Determiner component 352 assigns a cost to the fulfillment plan based on any projected future costs of replenishing inventory at the DCs to be used for the fulfillment plan that are unexpected and are caused by the fulfillment plan, such as based on inventory information in an inventory database 325 on storage and on projections (not shown) for future orders for items (e.g., based on region, time-of-day, day-of-week, week-of-month, month-of-year, day-of-month, day-of-year, week-of-year, etc.). The DC Inventory Imbalance Cost Determiner component assigns a cost to the fulfillment plan based on an inventory imbalance of the ordered items at the DCs for the fulfillment plan, such as to increase the cost of using the fulfillment plan based on a shortage of the items, and may use current inventory database information as well as expected and/or optimal inventory information for the DCs (not shown) that was previously generated during a planning phase or is instead dynamically calculated.

After the Fulfillment Plan Cost Determiner component combines the various costs for each of the fulfillment plans in order to associate a total cost with that fulfillment plan, the Fulfillment Plan Ranker component 347 then ranks each fulfillment plan using a specified criteria, such as based on assigning those fulfillment plans having the lowest total cost to have the highest ranks. The Fulfillment Plan Ranker component then provides a ranked list of one or more of the fulfillment plans for which the cost was determined, such as to include only a specified number of the highest ranked fulfillment plans. In some embodiments, the Fulfillment Plan Cost Determiner component and/or the Fulfillment Plan Ranker component may also prune some of the fulfillment plans during processing.

The Order Fulfillment Plan Dynamic Determiner system will then respond to the initially received request for fulfillment plan information by returning some or all of the results from the Fulfillment Plan Ranker component. In some embodiments, the system 340 will additionally analyze one or more of the fulfillment plans using one or more Fulfillment Plan Actual Delivery Information Determiner components, such as before responding to the client from whom the initial request was received. In the illustrated embodiment, a single Fulfillment Plan Actual Delivery Information Determiner component 332 is illustrated that is designed to determine actual delivery date/time information for a fulfillment plan.

In response to a request to provide actual delivery date/time information, whether from the system 340 or from another source, the Fulfillment Plan Actual Delivery Date Determiner component 332 will analyze one or more supplied fulfillment plans and determine an actual delivery date and/or actual delivery time for the order for each fulfillment plan. In situations in which an order has multiple splits, the Actual Delivery Date Determiner component may in some embodiments determine a single actual delivery date/time for the entire order (e.g., based on a latest or last of the delivery dates/times for the order splits) or may instead in other embodiments calculate actual delivery date/time information for each of the order splits.

As previously noted, the information available from the order fulfillment computer system may be requested by various sources, such as by a Web server computing device for a Web merchant providing an item ordering service. In the illustrated embodiment, the Web server computing devices 370 each include a CPU 372, I/O devices 373, storage 374 and memory 375. Executing in memory is a Web server 376 that receives requests for Web pages and other information, retrieves relevant information (e.g., from available item information 371 on storage 374), and supplies appropriate Web pages to the requesters.

In some embodiments, the Web server will interact with an optional Fulfillment Plan Information Obtainer component 378 executing in memory that is able to communicate with the order fulfillment computer system in order to obtain information about order fulfillment plans and/or actual delivery information about order fulfillment plans. If so, the Web server component 376 can include some or all of the information received from the order fulfillment computer system in the information provided to the requester.

The Web server component may also interact with an optional Option Presenter component 379 executing in memory that obtains information about multiple fulfillment plans that are options for fulfilling an order, and adds such information to Web pages in such a manner as to provide to users selectable choices of differing fulfillment plans that are available to be used for an order and/or of other services (e.g., expedited processing) that are available to be used as part of the order fulfillment. After receiving an indication from a user to place an order, the Web server will interact with an order fulfiller component to complete the order (e.g., order fulfiller 334 executing in memory 330), such as by using a selected fulfillment plan for the order.

The client computing devices 360 each include a CPU 362, I/O devices 364, storage 366 and memory 367. In the illustrated embodiment, a Web browser program 369 is executing in memory, such as for a user of the client computing device to obtain and display information from Web server computing devices, such as information about items to be ordered and about fulfillment plan options and information related to such items and orders.

Those skilled in the art will appreciate that computing devices and systems 300, 360 and 370 are merely illustrative and are not intended to limit the scope of the present invention. Computer system 300 may be connected to other devices that are not illustrated, including through one or more networks such as the Internet or via the World Wide Web (WWW). In addition, the functionality provided by the illustrated system components may in some embodiments be combined in fewer components or distributed in additional components. Similarly, in some embodiments the functionality of some of the illustrated components may not be provided and/or other additional functionality may be available. For example, different computer systems may be used to determine one or more fulfillment plans and to determine various information of interest about such fulfillment plans.

Those skilled in the art will also appreciate that, while various components and database data structures are illustrated as being stored in memory or on storage while being used, these items or portions of them can be transferred between memory and storage for purposes of memory management and data integrity. Alternatively, in other embodiments some or all of the software modules may execute in memory on another device and communicate with the illustrated computer system via inter-computer communication. Some or all of the components or data structures may also be stored (e.g., as instructions or structured data) on a computer-readable medium, such as a hard disk, a memory, a network, or a portable article to be read by an appropriate drive. The components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In the illustrated embodiment, systems interact over the Internet by sending HTTP messages and exchanging Web pages. Those skilled in the art will appreciate that the disclosed techniques can be used in various environments other than the Internet. For example, the techniques can also be used in an electronic mail environment. In addition, a "client" or "server" may comprise any combination of hardware or software that can interact, including computers, network devices, Internet appliances, PDAs, wireless phones, pagers, electronic organizers, television-based systems and various other consumer products that include inter-communication capabilities. Communication protocols other than HTTP can also be used, such as WAP, TCP/IP, or FTP.

Figure 4:
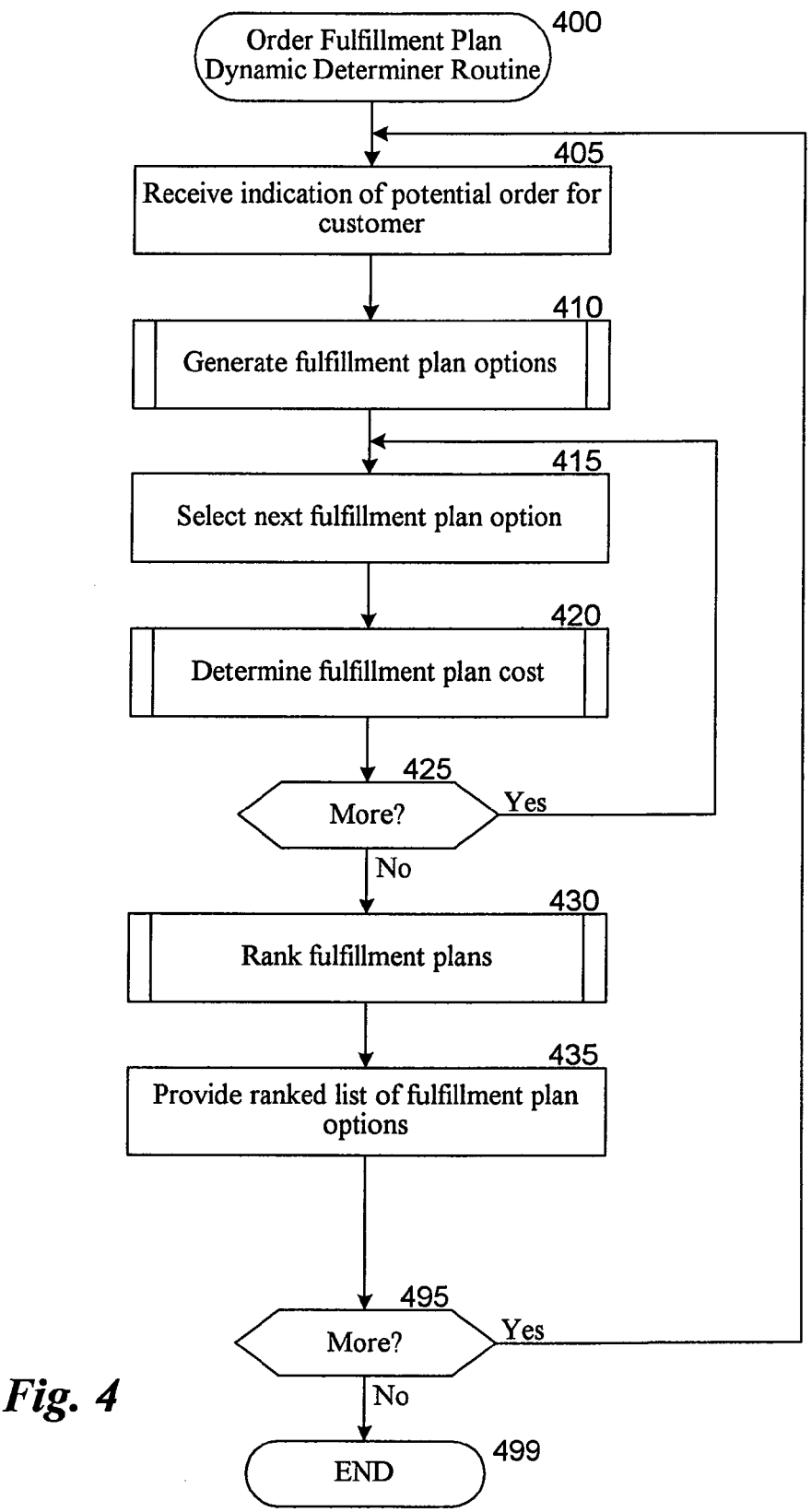
FIG. 4 is a flow diagram of an embodiment of the Order Fulfillment Plan Dynamic Determiner routine.

FIG. 4 is a flow diagram of an embodiment of the Order Fulfillment Plan Dynamic Determiner routine 400. The routine receives an indication of an order or potential order, generates multiple fulfillment plans for fulfilling that order, determines overall fulfillment costs to be associated with some or all of the generated fulfillment plans, ranks the fulfillment plans based on a criteria in use (e.g., total cost), and provides a ranked list of one or more fulfillment plans.

The routine begins at step 405 where an indication is received of an order or potential order for a customer, such as a request from a Web server for a Web merchant item ordering service that desires to provide various types of fulfillment plan information to a customer or potential customer. The routine continues to step 410 to execute a subroutine to generate multiple fulfillment plans for the indicated order. The routine then continues in steps 415-425 to select each of the fulfillment plans and to determine an overall cost associated with use of that fulfillment plan, such as a total cost that includes direct costs, assigned customer goodwill costs, and/or assigned modeled future costs of fulfilling future orders. After the overall cost is determined for each of the fulfillment plans, the routine continues to step 430 to rank some or all of the fulfillment plans based on a criteria in use, such as to optimize order processing that occurs over a specified time period by selecting fulfillment plans that have a lowest total determined cost. In step 435, the routine then provides a ranked list of some or all of the fulfillment plans to the client from which the indication of the order was received. In step 495, the routine determines whether to continue. If so, the routine returns to step 405, and if not the routine continues to step 499 and ends.

In other embodiments, additional processing may take place, such as to prune some of the fulfillment plans at various times based on various tests or heuristics. In addition, in other embodiments information may be provided by the routine about only a single fulfillment plan, such as the fulfillment plan having the highest ranking. In addition, a criteria to be used can be determined in various ways, such as by using a default or constant criteria, a criteria based on the customer, on the type of order, and/or on the client requesting the fulfillment plan information, and/or based on an explicit indication of a criteria provided in the received indication of the order.

Figure 5:
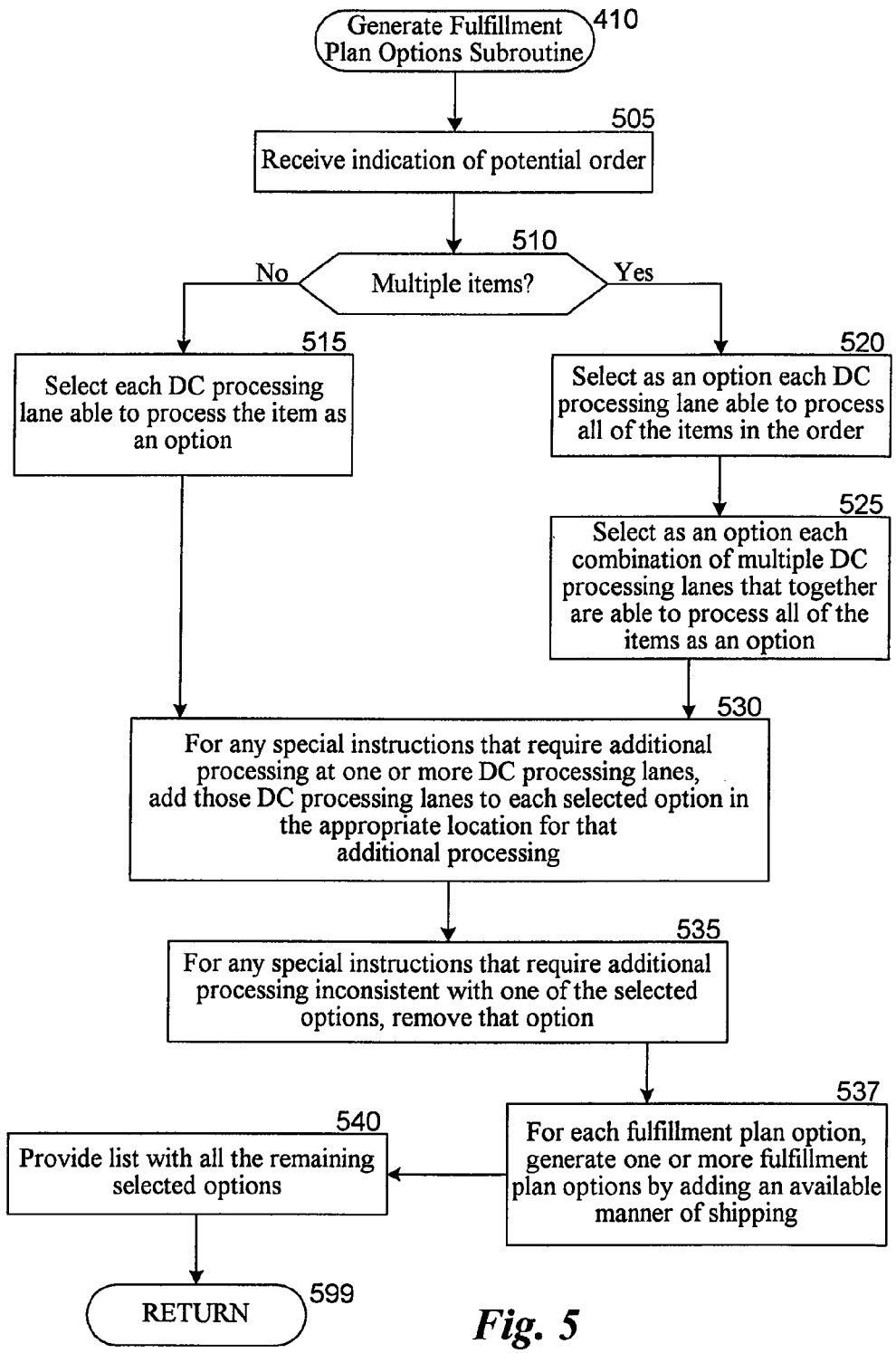
FIG. 5 is a flow diagram of an embodiment of the Generate Fulfillment Plans subroutine.

FIG. 5 is a flow diagram of an embodiment of the Generate Fulfillment Plans Subroutine 410. The subroutine receives an indication of an order or potential order, determines some or all of the DCs that can fulfill the order (either alone or in combination with other DCs), determines additional alternatives for fulfilling the order from each of the determined DCs or DC combinations (e.g., different manners of shipping, different manners of acquiring one or more items of the order, different processing lanes within a DC that can process the order, different manners of processing an order such as based on additional optional services that can be provided, different manners of supplying items of an order or a packaged order to a shipper or other third-party service provider for shipping, etc.), and provides a list of corresponding fulfillment plans. As noted, in some embodiments some such fulfillment plans may be pruned for various reasons, such as a determination that the fulfillment plan is impractical or less desirable than other fulfillment plans that are retained.

The subroutine begins at step 505 where an indication is received of an order or potential order. The subroutine continues to step 510 to determine if there are multiple items in the order. If not, the subroutine continues to step 515 to select each DC processing lane that is able to process an order for the item. Each such processing lane will serve as the basis for one or more fulfillment plans for fulfilling the order. In other embodiments, fulfillment plans may model processing capabilities at other levels of detail, such as by representing only DCs not processing lanes, or instead representing individual workers or types of workers on a particular processing lane or particular shift. If it was instead determined in step 510 that multiple items are present in the order, the subroutine continues to step 520 to select as the basis for one or more fulfillment plans each DC processing lane that is able to process all of the items in the order. For example, some processing lanes may be eliminated for consideration based on those lanes processing only single-item orders, processing only orders for different types of items than are present in the current order, providing specialized services not needed for this order or lacking specialized services that are needed, etc. After step 520, the subroutine continues to step 525 to select as the basis for one or more fulfillment plans each combination of multiple DC processing lanes that together can process all of the items, such as by splitting the order in various ways (e.g., by having each item in the order processed by a different processing lane or by creating sub-groups of order items to be processed together that are logically related).

After steps 515 and 525, the subroutine continues to step 530 to determine whether the order includes any special instructions that require additional processing at one or more DC processing lanes, such as for specialized services (e.g., gift wrapping), and if so adds those DC processing lanes to each selected basis in an appropriate manner (e.g., after multiple book items are packaged together into a single box, the box is forwarded to the gift wrapping processing lane). If multiple processing lanes are available at a DC to provide a specialized service, a single selected fulfillment plan basis for that DC may spawn multiple fulfillment plans that differ by only the processing lane used for the specialized instructions.

The subroutine then continues to step 535 to determine whether any special instructions associated with the order are inconsistent with one or more of the fulfillment plan bases, and if so they are pruned from consideration by discarding those fulfillment plan bases. While fulfillment plan bases will be pruned in the illustrated embodiment if requested specialized services are not available at an DC, in other embodiments the specialized instructions may instead be rejected for such fulfillment plan bases or may be accomplished by having the order processed at multiple DCs in a serial manner as needed. As noted above, one example may be a situation in which an order requires a specialized service such as gift wrapping or a specialized type of inventory such as a rare book or one-of-a-kind collectibles that are stored in a single DC.

The subroutine next continues to step 537, where for each remaining fulfillment plan basis one or more related fulfillment plans are generated by associating different manners of shipping the order to the recipient with that fulfillment plan basis. For example, a fulfillment plan basis for a 2-item order that uses two different DCs for the order fulfillment could spawn numerous different fulfillment plans when shipping is considered, such as by shipping both items by each of several different shipping manners and/or by shipping the two items using various combinations of different shipping manners. After step 537, the routine continues to step 540 to provide a list of some or all of the fulfillment plans, and then continues to step 599 and returns.

As previously noted, in other embodiments a variety of additional types of factors may be considered and used to further generate additional fulfillment plans. For example, if alternatives exist as to how an item is acquired, such as from an internal inventory or from a third-party source, different manners of acquiring such items could further split a fulfillment plan basis into multiple fulfillment plans. Conversely, in an embodiment where a recipient may pick-up an order at a DC, some or all of the fulfillment plans may not include a manner of shipping an item. In addition, in some embodiments, some fulfillment plans will be generated by adding optional extra services or processing, even if such services or processing were not indicated or requested, such as to allow a customer to select such an enhanced choice (e.g., to upsell an order in various ways).

Figure 6:
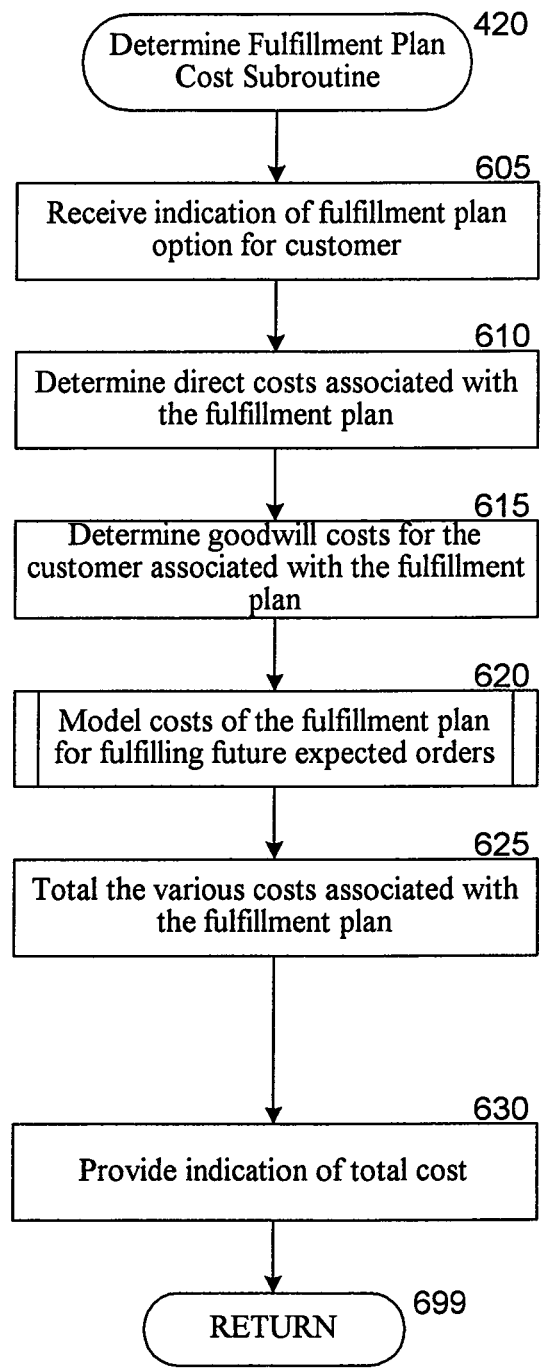
FIG. 6 is a flow diagram of an embodiment of the Determine Fulfillment Plan Cost subroutine.

FIG. 6 is a flow diagram of an embodiment of the Determine Fulfillment Plan Cost subroutine 420. The subroutine receives an indication of a fulfillment plan and associates with it various costs of using that fulfillment plan to fulfill an order, such as direct costs, assigned customer goodwill costs, and modeled future costs associated with fulfilling expected future orders.

The subroutine begins at step 605 where an indication is received of a fulfillment plan for a customer. The subroutine continues to step 610 to determine direct costs associated with the fulfillment plan, such as shipping costs, labor costs, packing material costs, item receipt and stocking costs, item sourcing costs if applicable, etc. The subroutine then continues to step 615 to assign one or more types of goodwill costs to the fulfillment plan, such as in a general manner or in a manner specific to the customer. Goodwill costs may be assigned based on delays in receiving an order (in either an absolute sense or relative to a customer's expectation of when they will receive the order) and deviations in the number of separate packages received for the order, such as based on the order being split. After step 615, the subroutine continues to step 620 to execute a subroutine to model the future costs for fulfilling future expected orders based on using this fulfillment plan to fulfill the current order. The subroutine then continues to step 625 to total the various costs associated with the fulfillment plan, and in step 630 provides an indication of the total cost. The subroutine then returns at step 699. In various other embodiments additional types of costs may be additionally considered and/or illustrated types of costs may not be included.

Figure 7:
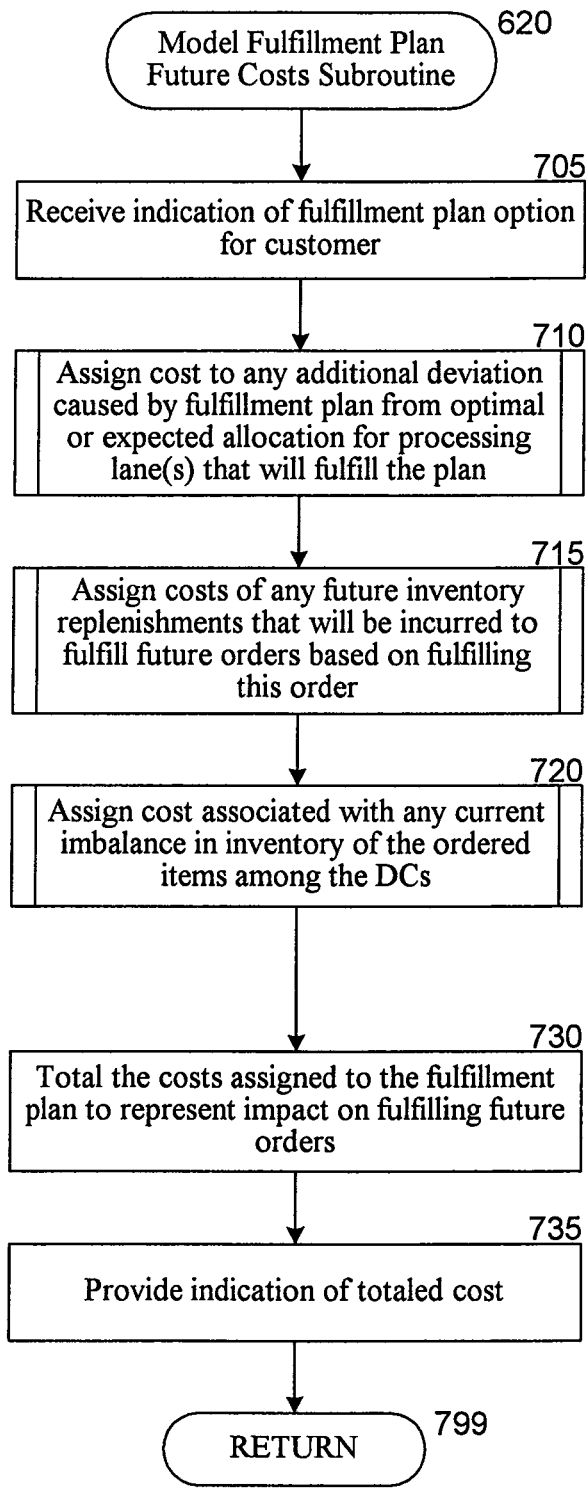
FIG. 7 is a flow diagram of an embodiment of the Model Fulfillment Plan Future Costs subroutine.

FIG. 7 is a flow diagram of an embodiment of the Model Fulfillment Plan Future Costs subroutine 620. The subroutine receives an indication of a fulfillment plan for a customer and assigns costs to the fulfillment plan based on using the fulfillment plan to fulfill the current order, with the assigned costs representing various types of future costs that may be incurred due to the current use of this fulfillment plan.

The subroutine begins at step 705 where an indication is received of a fulfillment plan for a customer. In step 710 a subroutine is executed to determine any deviations that would be caused by use of this fulfillment plan between an actual allocation of orders and an expected or optimal allocation of orders for the DCs and/or processing lanes utilized by this fulfillment plan. A cost is then assigned to this fulfillment plan based on any such deviations, such as by using a formula shared by all orders, customers, and DCs/processing lanes, or instead using a method of calculating the cost specific to one or more of these factors.

The subroutine next continues to step 715 to execute a subroutine to assign costs to represent any future unexpected inventory replenishments that will be incurred when fulfilling future orders based on using this fulfillment plan to fulfill the current order. For example, if use of this fulfillment plan causes a DC to exhaust inventory of an item for which it otherwise would not have and an expected future order for the item will be received after the exhaustion has occurred, then additional costs may be assigned to this fulfillment plan based on those expected future costs (e.g., a customer goodwill cost for that future order due to a delay in receipt, or an expedited inventory restocking fee for the item in the future, such as by outsourcing the item from a high priced third-party supplier). Thus, various types of costs can be assigned to reflect the expected types of future costs that will be incurred if such a scenario occurs.

The subroutine then continues to step 720 to execute a subroutine to assign costs to the current fulfillment plan based on any inventory imbalances for items of the order at the DC that will be used by this fulfillment plan to fulfill those items. For example, if the DC has less inventory for the item than is expected to be needed based on projected future demand, a cost may be assigned to the current fulfillment plan in order to artificially shift some demand for the item to other DCs that may have more inventory.

After step 720, the subroutine continues to step 730 to total the various types of modeled future costs assigned to the fulfillment plan, and in step 735 provides an indication of the total cost. The subroutine then returns to step 799. In other embodiments, various other types of modeled future costs could be calculated, or instead some of the illustrated modeled future costs may not be used or may be calculated in other manners.

Figure 8:
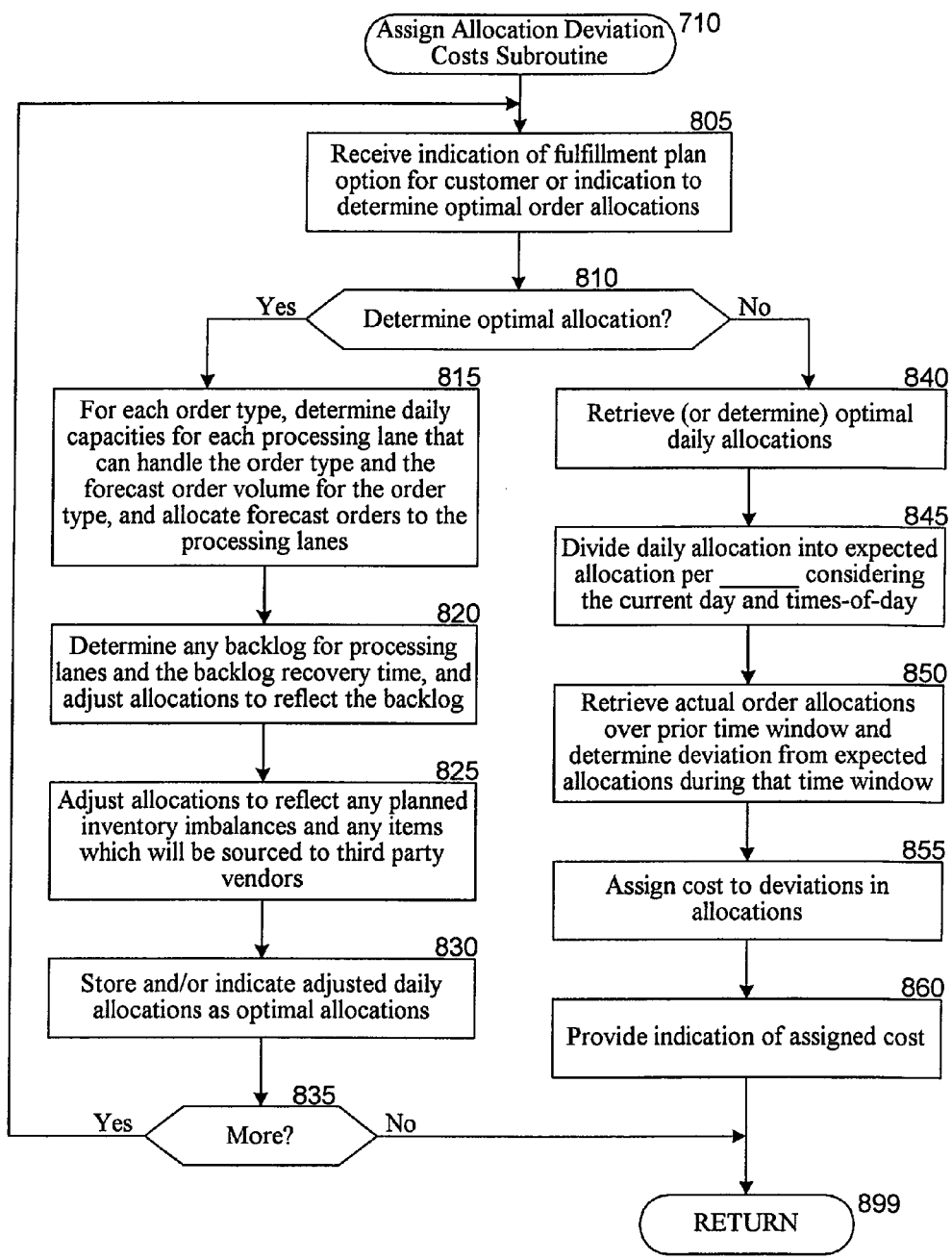
FIG. 8 is a flow diagram of an embodiment of the Assigned Allocation Deviation Costs subroutine.

FIG. 8 is a flow diagram of an embodiment of the Assigned Allocation Deviation Costs subroutine 710. The subroutine receives an indication of a fulfillment plan for a customer, determines whether deviations currently exist between actual allocations of orders and expected or optimal allocations of orders for the DCs/processing lanes to be used for this fulfillment plan, and assigns costs to any such deviations. While in some embodiments all of the processing will be performed in a dynamic manner at the time a request is made, in the illustrated embodiment the subroutine is divided into a planning phase represented b$_y$, steps 815-830, in which projections are made of expected or optimal allocations for a future time period (e.g., on a periodic basis or as needed due to order volume), and an execution phase represented by steps 840-860, which at the time of receiving an indication of a fulfillment plan determines actual orders that have been allocated over a recent previous time period and compares those actual order allocations to previously projected allocations for that same time period.

The subroutine begins in step 805 where an indication is received of a fulfillment plan for a customer or instead an indication is received to execute the planning phase of the algorithm. The subroutine continues to step 810 to determine if the planning phase is to be executed to determine an optimal allocation for a future time period, and if so continues to step 815. At step 815, a time period of a day is selected for the future projected allocation period, and projections are then made for that time period for each type of order. In particular, for each order type an overall order volume is forecast for the time period, and the various processing lanes that can handle the type of order are then identified. The overall forecast order volume is then divided between the processing lanes, taking into consideration such factors as differing capacities (e.g., based on staffing levels), differing demands for the type of order in the region normally served by that processing lane's DC, other types of orders that may be simultaneously allocated to that processing lane, etc.

The subroutine then continues to step 820 to determine any backlog that exists for the identified processing lanes as well as an expected backlog recovery time, and adjusts the optimal processing lane allocations to reflect the need to also process those backlog orders over the expected backlog recovery time. In step 825, the subroutine then determines whether any planned inventory imbalances exist, such as to represent projected differing demand in different regions, and adjusts the allocations to correspond to such planned inventory imbalances. Similarly, a determination is made in the illustrated embodiment as to whether any of the orders of this type (or items of such orders) will be outsourced to third-party vendors, and if so the allocations to the processing lanes can be varied to reflect such outsourcing (e.g., if differing amounts of processing are required for outsourced orders or items as compared to non-outsourced orders or items, or if a delay should be considered for outsourced items based on a time for acquiring such outsourced items).

The subroutine then continues to step 830 to store the adjusted daily allocations as optimal allocations that are predicted for that time period and/or to indicate those adjusted daily allocations to a requestor, such as to the execution phase of the algorithm if the planning phase had not previously been performed. In step 835, the subroutine then determines whether additional processing should take place, such as to set a timer and to return to request an additional planning phase at a later time. If additional processing is to take place, the subroutine returns to step 805.

If it was instead determined in step 810 that the execution phase of the algorithm is to be performed, the subroutine continues to step 840 to retrieve stored optimal daily allocations corresponding to a previous time window (e.g., 8 hours or 24 hours), or to request the planning phase to dynamically generate such numbers if they are not already generated or available. The subroutine then continues to step 845 to divide the optimal daily allocation into an expected allocation per hour time frame, considering various factors such as the current day (e.g., of the week, of the month, of the year, etc.), the current time zone of the DCs and/or of the customers of those DCs, etc. In other embodiments, such a division could instead be performed during the planning phase. In step 850, the subroutine then retrieves actual order allocations over the previous time window, and determines deviations between the expected allocations and the actual allocations during that time window. In step 855, the subroutine assigns a cost to the deviations in the allocations, and in step 860 provides an indication of the assigned costs. After step 860, or if it was determined in step 835 that no more processing was to be performed, the subroutine continues to step 899 and returns.

As previously noted, the manner of assigning costs to deviations can be performed in a variety of ways, such as based on a relevant DC and/or processing lane, a customer, an order type, an item, etc. In addition, a cost adjustment formula could be dynamically modified in a variety of ways in order to reflect current conditions or goals, such as to control how quickly existing deviations are corrected. For example, if a non-linear cost adjustment formula is used, an elasticity value could be associated with the function (e.g., a degree of exponential growth for an exponential function) in order to control how quickly costs grow with an amount of deviation. Similarly, for linear or other types of functions, similar adjustment parameters could be used, such as a slope associated with a linear function.

Figure 9:
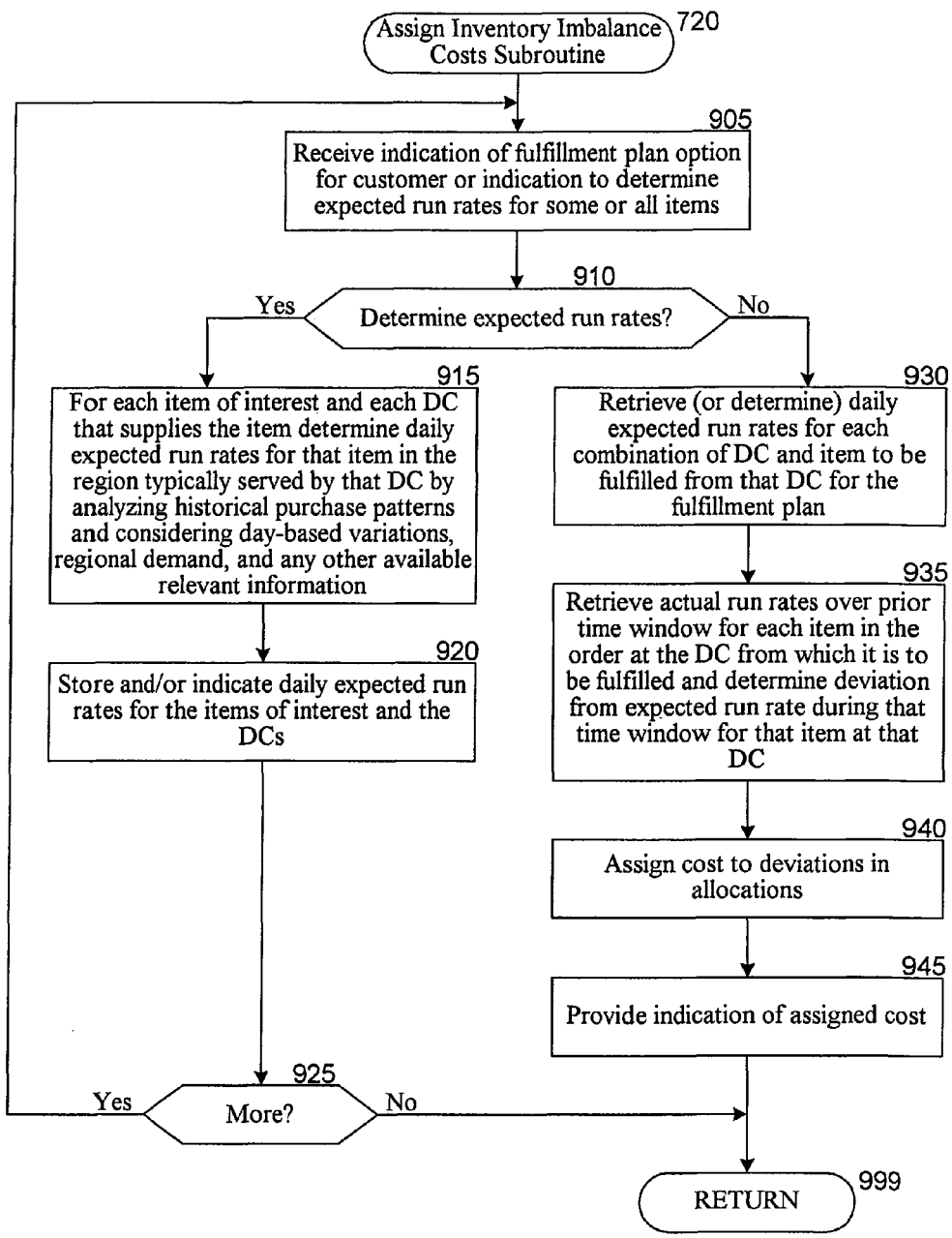
FIG. 9 is a flow diagram of an embodiment of the Assign Inventory Imbalance Costs subroutine.

FIG. 9 is a flow diagram of an embodiment of the Assign Inventory Imbalance Costs subroutine 720. The subroutine receives an indication of a fulfillment plan for a customer or instead an indication to perform a planning function to determine expected future sales rates (or "run rates") for a specified time period. In the illustrated embodiment, the subroutine is separated into separate planning and execution phases, with the planning phase represented by steps 915-920 and the execution phase represented by steps 930-945. In the planning phase, such as may be executed periodically or as order volume demands, inventory sales rates are projected for a future time period, such as to assist in planning for fulfilling such orders (e.g., by allocating inventory as appropriate among DCs and/or preparing for different staffing levels that are needed). During the execution phase, a determination is made of any deviations that occurred during a prior time window between an actual sales rate of items and the projected sales rates of items for that time period, such as to indicate a current imbalance in inventory (e.g., if inventory had been previously allocated according to the expected sales rates). In other embodiments, the subroutine may not include a separate planning phase, and may instead make all of the relevant determinations dynamically.

The subroutine begins at step 905 where an indication is received of a fulfillment plan or an indication is instead received to execute a planning phase to determine expected future sales rates for some or all items. The subroutine continues to step 910 to determine if the planning phase is to be executed, and if so continues to step 915. In step 915, each item of interest is identified, as well as each DC that stocks the item. Forecasts are then made for a future time period (e.g., a day) based on a variety of available information, such as historical purchase patterns for a region typically served by a DC, any information specific to the future time period (e.g., a particular day-of-the-week), etc. In step 920, the subroutine then stores the determined expected sales rates for the items at the DCs for the future time period and/or indicates those values to a requestor, such as the execution phase of the algorithm. The subroutine then continues to step 925 to determine whether to continue processing, such as to set a timer and to return after it expires to perform an additional planning phase.

If it was instead determined in step 910 that the execution phase of the subroutine is to be performed, the subroutine continues to step 930 to retrieve or determine daily expected run rate information for a prior time window (e.g., a day) for each combination in the current fulfillment plan of an item to be fulfilled and of a DC that is fulfilling that item. In step 935, actual sales rate information is then retrieved for those items at those DCs for the prior time window (e.g., based on orders actually allocated or on a predetermined limit or target for a number of orders to be allocated), and deviations are determined between the expected and actual sales rates for those items during that time window at that DC. In step 940, costs are then assigned to any deviations in allocations, such as in a manner similar to that previously described with respect to allocation deviations. In step 945, the subroutine then provides an indication of the costs assigned to the current fulfillment plan. After step 945, or if it was instead determined in step 925 not to continue processing, the subroutine continues to step 999 and returns. As with other modeled future costs, such inventory imbalance costs can be calculated in other manners in other embodiments, and in still other embodiments may not be used.

Figure 10:
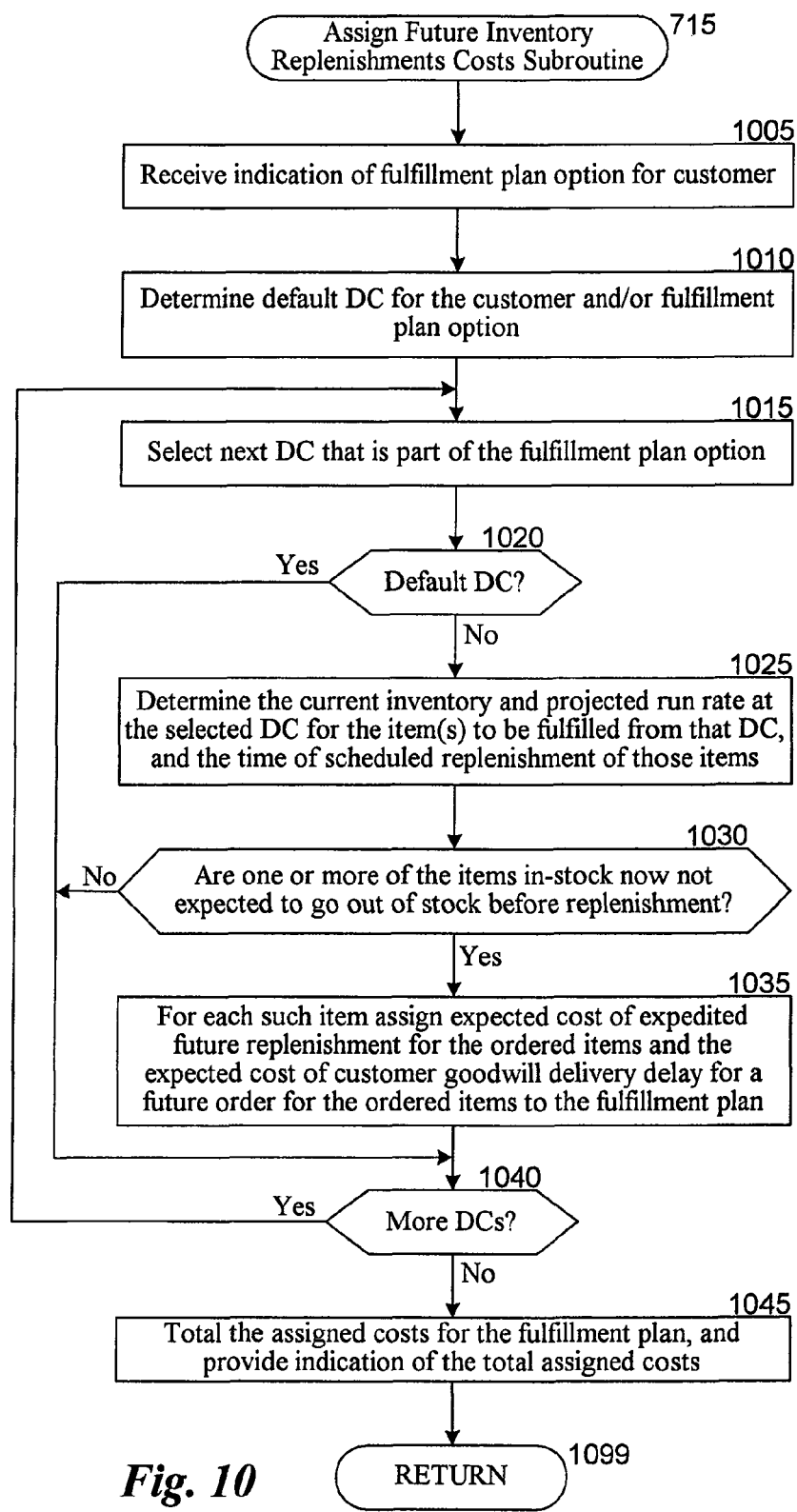
FIG. 10 is a flow diagram of an embodiment of the Assign Future Inventory Replenishment Costs subroutine.

FIG. 10 is a flow diagram of an embodiment of the Assign Future Inventory Replenishment Costs subroutine 715. The subroutine receives an indication of a fulfillment plan, determines whether use of that fulfillment plan will cause one or more of the DCs that are used in the fulfillment plan to be expected to exhaust inventory in the future for an item being ordered before replenishment of that item is scheduled to occur, and assigns costs to some or all such inventory exhaustion.

The subroutine begins at step 1005 where an indication is received of a fulfillment plan for the customer. The subroutine continues to step 1010 to determine a default DC for the customer and/or for the fulfillment plan. In the illustrated embodiment, costs will only be assigned to a fulfillment plan if the fulfillment plan uses a DC that is not the default DC and that other DC will have the future inventory replenishment costs, although in other embodiments such a restriction may not be present. The subroutine next continues to step 1015 to select the next DC that is part of the fulfillment plan, beginning with the first such DC, and in step 1020 determines if the DC is the default DC. If so, the subroutine continues to step 1040, skipping the cost assignment steps in steps 1025-1035.

If it is instead determined that the current DC is not the default DC, however, the subroutine continues to step 1025 to determine the current inventory of the items to be fulfilled by that DC in the current fulfillment plan and to determine the projected sales rate of those items (e.g., based on the planning phase of the Inventory Imbalance subroutine) in order to determine whether the inventory of the item is expected to be exhausted before a scheduled replenishment of that item will occur. If it is determined in step 1030 that one or more of the items are currently in stock but are expected to go out of stock before such replenishment, the subroutine continues to step 1035. If instead the items will not go out of stock before replenishment or if the items are already out of stock, the subroutine continues to step 1040 and skips the cost assignment step of 1035. Thus, in the illustrated embodiment, the costs are assigned to a fulfillment plan only if its use will contribute to the inventory exhaustion occurring, and so no costs are assigned if the inventory is already out of stock. In other embodiments such a restriction may not be present.

In step 1035, for each such item that is in stock now but is expected to be out of stock before replenishment, an expected cost is assigned to the current fulfillment plan based on one or more expected future orders for the items, such as a cost of expedited item replenishment for such future orders and/or an expected cost of customer goodwill based on delivery delay for such future orders. In other embodiments, additional processing may be performed to estimate whether future orders for such items are expected to occur between the time of inventory exhaustion and inventory replenishment, and if so such costs may be assigned only if such future orders are expected. In some embodiments costs are assigned only to such future orders that could have been fulfilled but for using the current fulfillment plan to fulfill the current order. After step 1035, the subroutine continues to step 1040 to determine if there are more DCs associated with the current fulfillment plan, and if so returns to step 1015 to select the next such DC. If not, the subroutine continues to step 1045 to total the assigned costs from all of the DCs for the fulfillment plan, and to provide an indication of the total assigned costs. In step 1099 the subroutine returns. As with other modeled future costs, in some embodiments such costs will be calculated in other manners, and in other embodiments such costs may not be used.

Figure 11:
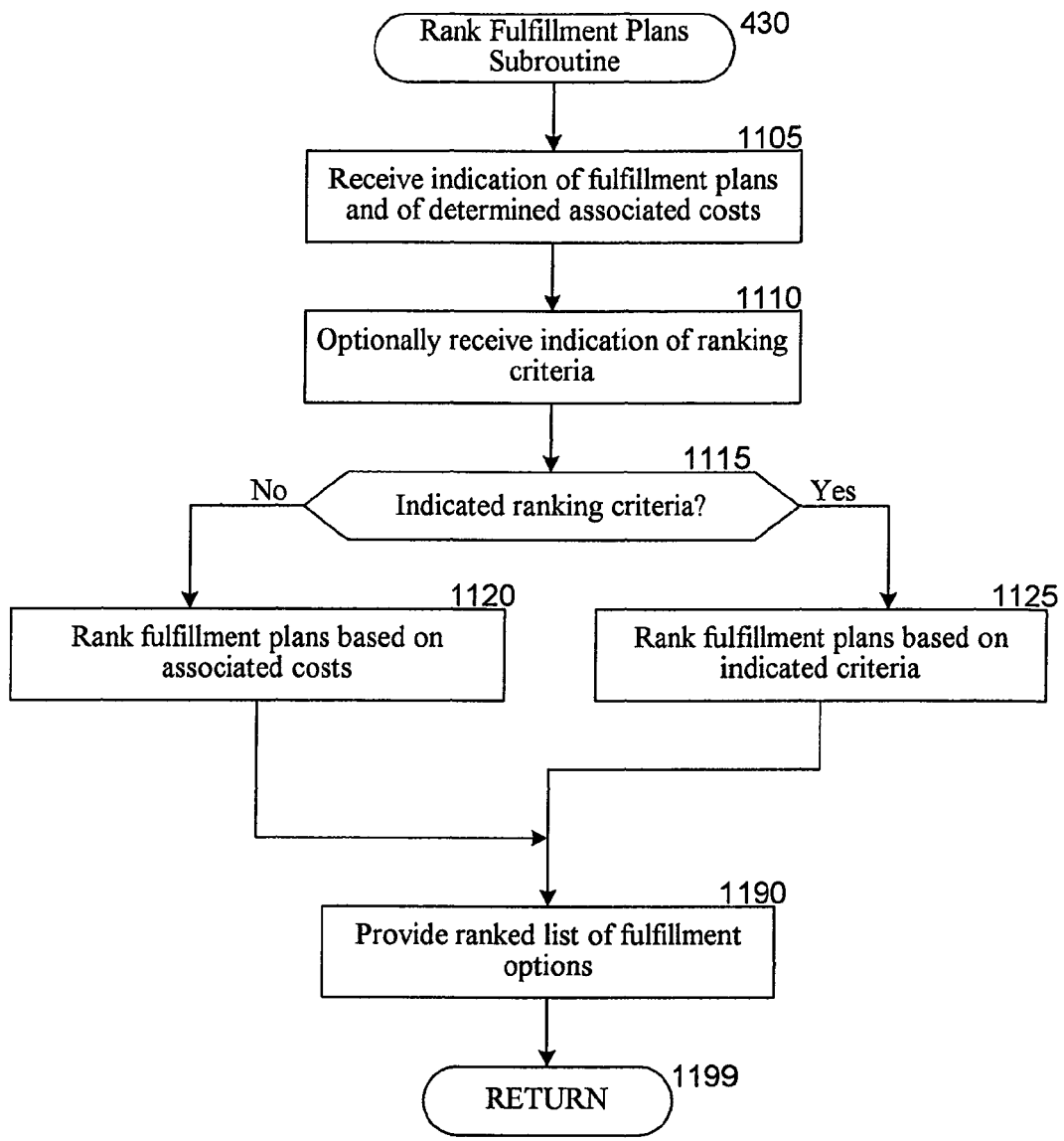
FIG. 11 is a flow diagram of an embodiment of the Rank Fulfillment Plans subroutine.

FIG. 11 is a flow diagram of an embodiment of the Rank Fulfillment Plans subroutine 430. The subroutine receives indications of one or more fulfillment plans and of determined associated costs, and ranks the plans based on a criteria in use (e.g., inversely with the total costs).

The subroutine begins in step 1105 where an indication is received of one or more fulfillment plans and of determined associated costs. The subroutine continues to step 1110 to optionally receive an indication of a ranking criteria to be used. In step 1115, if it is determined that no optional ranking criteria was provided, the subroutine continues to step 1120 to rank the fulfillment plans based on the received associated costs. If it instead determined that a ranking criteria was provided, the subroutine continues to step 1125 to rank the fulfillment plans based on the indicated criteria. After steps 1120 or 1125, the subroutine continues to step 1190 to provide a ranked list of one or more of the fulfillment plan as options for fulfilling the order (e.g., such based on an optional supplied indication of a number of the highest ranked options to return). In step 1199 the subroutine returns.

Figure 12:
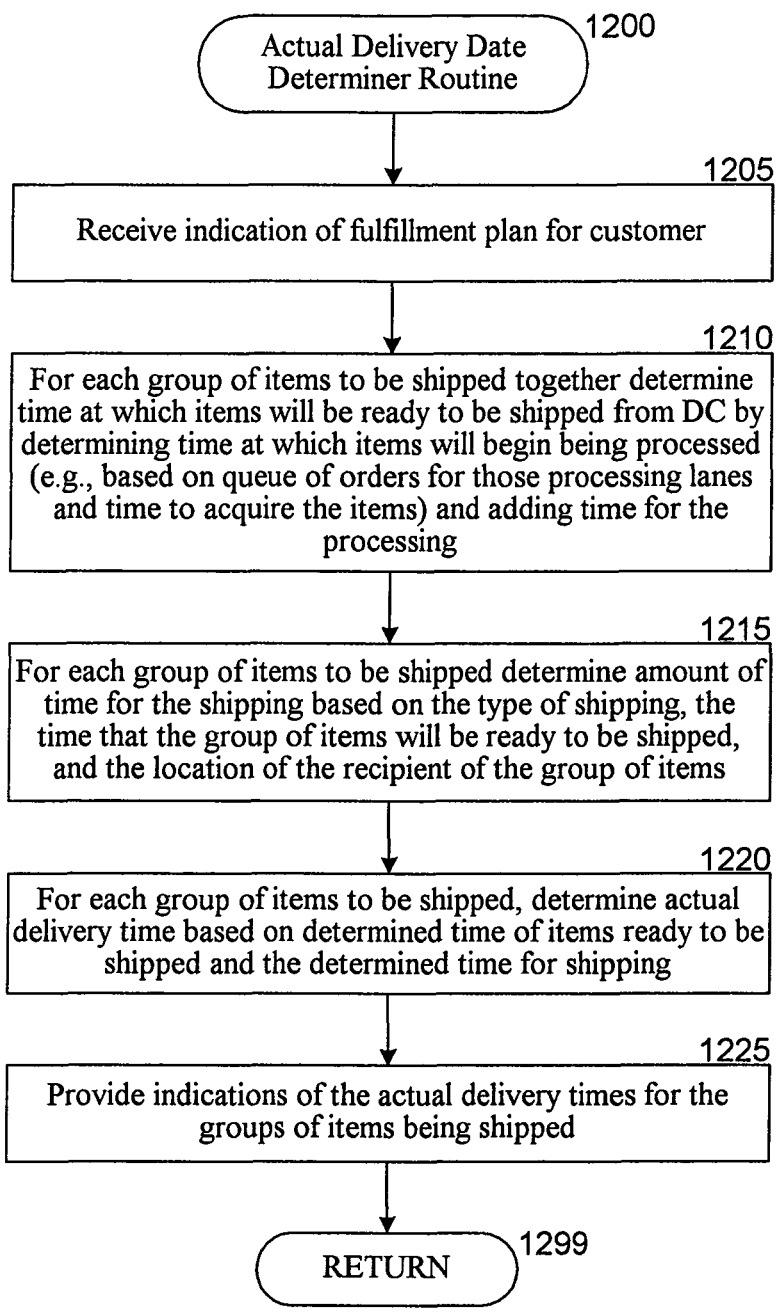
FIG. 12 is a flow diagram of an embodiment of the Actual Delivery Date Determiner routine.

FIG. 12 is a flow diagram of an embodiment of the Actual Delivery Date Determiner routine 1200. The routine receives an indication of a fulfillment plan, and analyzes the fulfillment plan in order to determine an actual delivery date/time at which the recipients of the order will receive the items of the order. The actual delivery information determination can be based on a variety of types of available information, such as information about backlogs, processing times, inventories, etc. In particular, in the illustrated embodiment the actual delivery date/time information is determined by determining a time at which an order will be ready to be shipped and by determining a time for shipping. However, in other embodiments the actual delivery date/time can be determined in a variety of other ways, such as by considering additional factors (e.g., a time to acquire relevant items), ignoring some factors, and/or calculating some factors in a variety of other ways.

The routine begins at step 1205 where an indication is received of a fulfillment plan for the customer. The routine continues to step 1210 to determine for each group of items that are to be shipped together a time at which those items will be ready to be shipped from the DC from which they will be shipped, such as by determining a time at which the items will begin being processed (e.g., based on a queue of existing orders for the relevant processing lanes and the throughput of those lanes) and by adding a determined time for the processing. In step 1215, the routine then determines for each group of items to be shipped together an amount of time for the shipping, such as based on the manner of the shipping, the respective locations of the recipient and the DC, etc. In step 1220, the routine then determines an actual delivery time for each group of items to be shipped together based on the determined time that the items will be ready to be shipped and the determined time for the shipping, and in step 1225 provides indications of the actual delivery date/time for the overall order (e.g., a maximum of the individual order split times) and/or for the individual groups of items being shipped. In step 1299 the routine ends.

Figure 13:
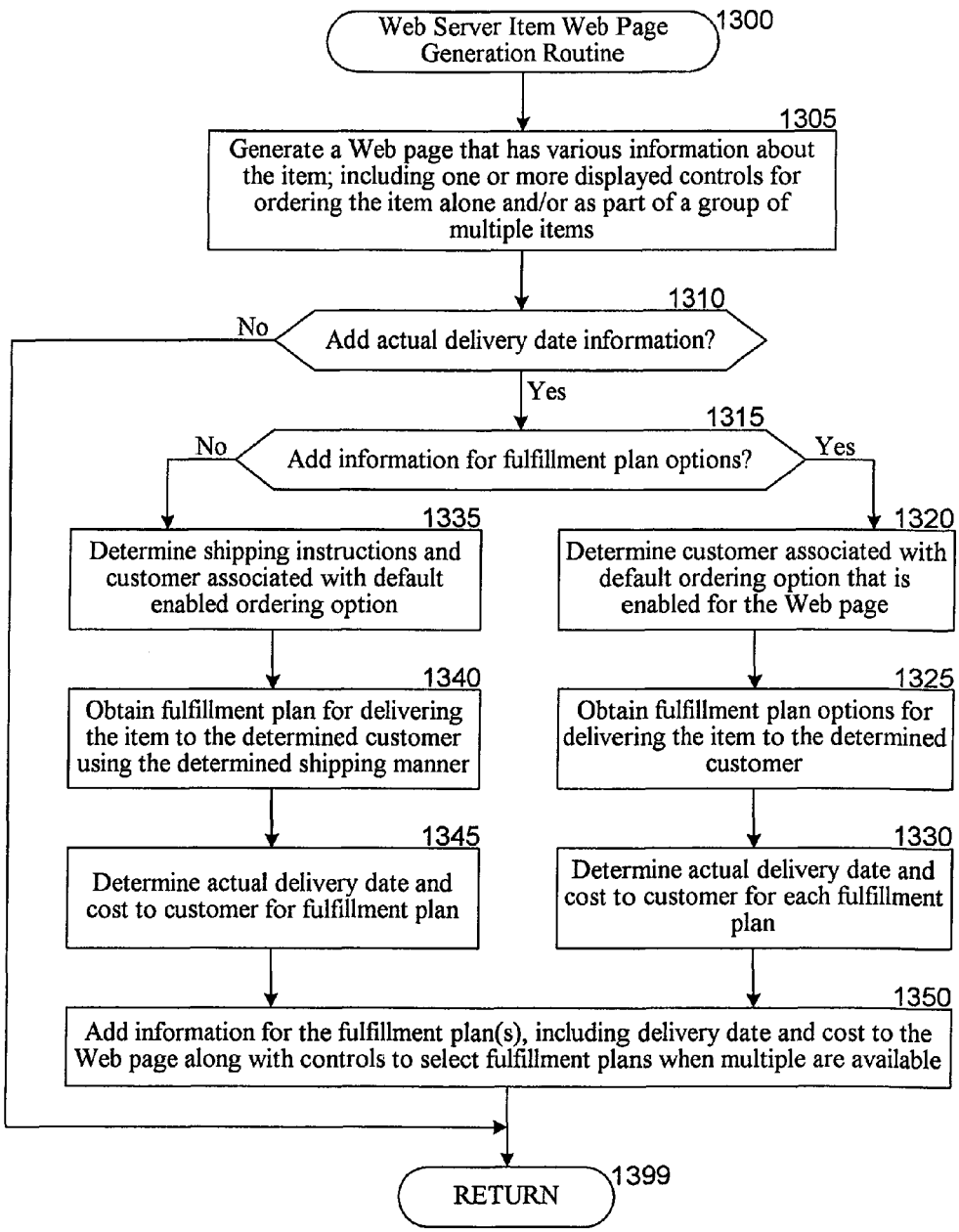
FIG. 13 is a flow diagram of an embodiment of the Web Server Item Web Page Generation routine.

FIG. 13 is a flow diagram of an embodiment of the Web Server Item Web Page Generation routine 1300. The routine generates a Web page that contains various information about an item that may be of interest to a potential customer, such as before an order has been placed for the item. In some situations, before providing the item information to the potential customer, the routine determines one or more fulfillment plans that are options for fulfilling an order for that item, determines various information of interest about such fulfillment plan options (e.g., actual delivery date/time and/or cost of use), and provides such fulfillment plan information to the potential customer before an order has been placed.

The routine begins at step 1305 where a Web page is generated that has various default information about an item, such as a description of the item, one or more displayed controls to allow a potential customer to interactively order the item (e.g., either alone or as part of a group of other items), etc. The routine continues to step 1310 to determine whether to add actual delivery date/time information to the Web page, and if not continues to step 1399 and ends, thus making the default Web page available for display. If it is instead determined to add actual delivery date/time information, the routine continues to step 1315 to determine whether to add information about multiple fulfillment plan options or to instead provide information about only a single selected fulfillment plan (e.g., the fulfillment plan that had the highest ranking).

If information is to be displayed for multiple fulfillment plan options, the routine continues to step 1320 to determine the potential customer to which the Web page will be provided, and optionally to determine information about a possible recipient other than the customer, such as based on a default ordering option for the customer that specifies to ship items to a recipient other than the customer. The routine then continues to step 1325 to obtain fulfillment plan options for delivering the item to the determined recipient (i.e., the customer if a self-order is to be made), and then continues to step 1330 to determine actual delivery date/time information, cost information, and/or other relevant information about the fulfillment plan options. In the illustrative embodiment, the various fulfillment plan options may include a variety of different types of options, including different manners of shipping, different optional services and/or types of processing, etc., while in other embodiments a single (e.g., default) type of information for such factors (e.g., shipping instructions) could instead be used for all of the fulfillment plan options that are provided.

If it is instead determined in step 1315 to add information about a single fulfillment plan, the routine continues to step 1335 to determine various information (if available) about a default ordering option used by the potential customer. In the illustrative embodiment, when providing information about a single fulfillment plan the routine will attempt to select a fulfillment plan that matches the default type of ordering for the potential customer (e.g., by only considering fulfillment plan options from which to select that are based on a type of shipping instruction for the default ordering type). The routine then continues to step 1340 to obtain a highest-ranked fulfillment plan for delivering the item to the determined recipient that uses the shipping manner determined for the default ordering option. In step 1345, the routine then determines an actual delivery date/time, customer cost to use, and/or other various information of interest about the obtained fulfillment plan.

After steps 1330 or 1345, the routine continues to step 1350 to add a variety of types of information to the default generated Web page, such as information about delivery dates/times and customer costs of use for each of the fulfillment plan options that were obtained. In addition, a variety of types of additional controls may be provided, such as to allow a user to interactively select one or more of the displayed fulfillment plan options. In some embodiments, the Web page will be designed in a manner to dynamically update itself to reflect changes made by the potential customer, such as by updating cost information to reflect a new fulfillment plan option that is selected and/or by generating new fulfillment plans if a new recipient is selected (e.g., based on a corresponding new ordering option selected to be the current default). After step 1350, the routine continues to step 1399 and ends. In various other embodiments, a variety of other types of fulfillment plan information can be determined and provided to potential customers in a similar manner.

Figure 14:
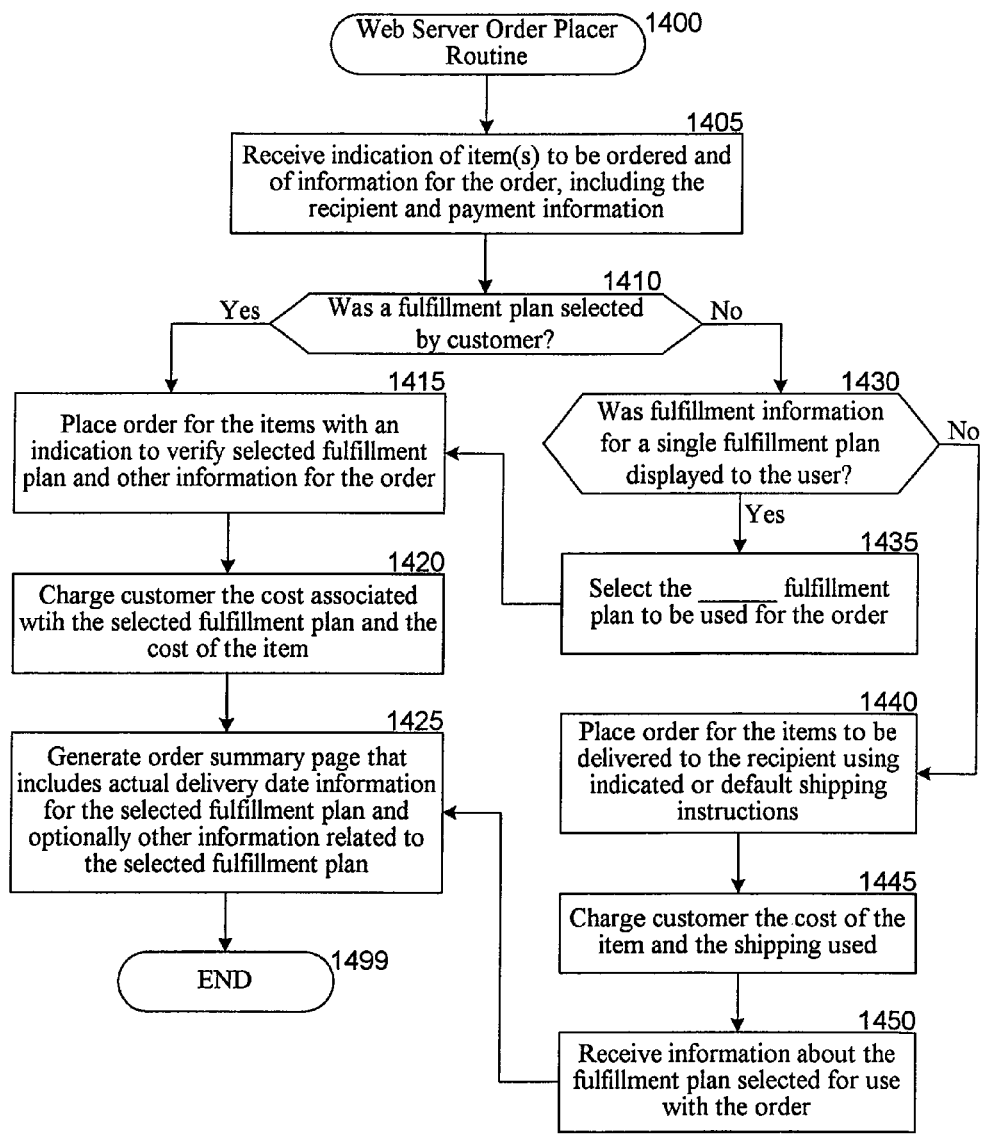
FIG. 14 is a flow diagram of an embodiment of the Web Server Order Placer routine.

FIG. 14 is a flow diagram of an embodiment of the Web Server Order Placer routine 1400. The routine receives information about an order that is being processed, determines an appropriate fulfillment plan to be used for the order, determines various information of interest about the determined fulfillment plan (e.g., actual delivery date/time information and cost to customer), and presents the determined relevant information to the customer during the ordering process, such as via an intermediate order Web page.

The routine begins at step 1045 where an indication is received of one or more items to be ordered and of related information for the order, such as the recipient and/or payment information. The routine continues to step 1410 to determine if a fulfillment plan was already selected for the order by the customer, such as based on choosing one of multiple fulfillment plan options that were provided to the user before the order was placed. If no fulfillment plan was selected by the user, the routine continues to step 1430 to determine if fulfillment information (e.g., actual delivery date/time information) was displayed to the user based on a single fulfillment plan. If so, the routine in step 1435 selects that single fulfillment plan for use.

After step 1435, or if it was instead determined in step 1410 that a fulfillment plan was explicitly selected by the customer, the routine continues to step 1415 to place an order for the items with an indication to use the selected fulfillment plan and other provided information for the order. In step 1420, the routine then charges the customer the costs associated with the selected fulfillment plan, including the cost of the items. The routine then continues to step 1425 to generate an order summary Web page that includes various information about the order and the selected fulfillment plan, such as actual delivery date/time information for the selected fulfillment plan.

If it was instead determined in step 1430 that fulfillment plan information was not previously displayed to the user or that multiple fulfillment plan options were provided but not chosen, the routine continues to step 1440 to place an order for the items to be delivered to the recipient using any indicated or default ordering instructions, such as shipping instructions. As part of the ordering process, an appropriate fulfillment plan will be dynamically determined for use, such as in a manner to minimize the modeled future cost of fulfilling expected future orders. The routine then continues to step 1445 to charge the customer the cost of the item and any associated shipping. In step 1450, the routine receives information about the fulfillment plan that was generated and used for the order, and then continues to step 1425 to provide information to the customer about that fulfillment plan. After step 1425, the routine continues to step 1499 and ends.

Figure 15:
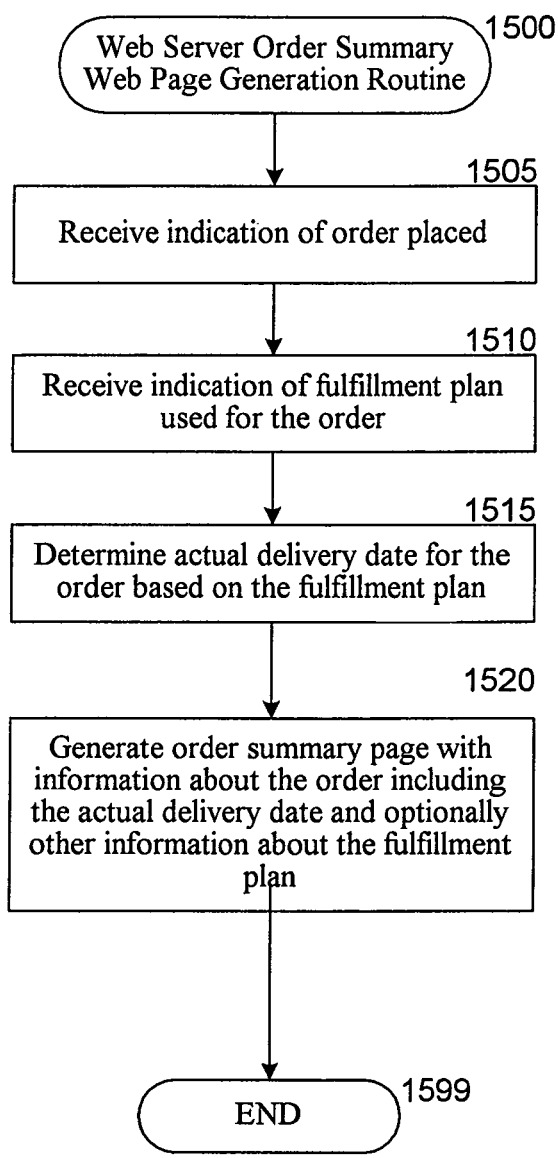
FIG. 15 is a flow diagram of an embodiment of the Web Server Order Summary Web Page Generation routine.

FIG. 15 is a flow diagram of an embodiment of the Web Server Order Summary Web Page Generation routine 1500. The routine receives an indication of an order that has been placed and of the fulfillment plan used to fulfill the order, determines various relevant information about the fulfillment plan, and provides an order summary Web page to the customer that includes such determined fulfillment plan information.

The routine begins at step 1505 where the indication of the order that was placed is received, and in step 1510 receives an indication of the fulfillment plan that was used for the order. In step 1515, actual delivery date/time information is determined for the order based on the fulfillment plan, with a variety of other types of information such as a current status of the order (e.g., the order has been placed in a queue for a processing lane or has already begun to be processed) being optionally determined. In step 1520, the routine then generates an order summary Web page that includes various information about the order, including the determined actual delivery date/time information and optionally any other determined relevant information about the fulfillment plan. Such an order summary Web page can be provided at various times, such as part of the ordering process when provided immediately subsequent to an order being placed, or later to provide then-current status information about an order (e.g., after a customer later returns to the item ordering service). After step 1520, the routine continues to step 1599 and ends.

Figure 16:
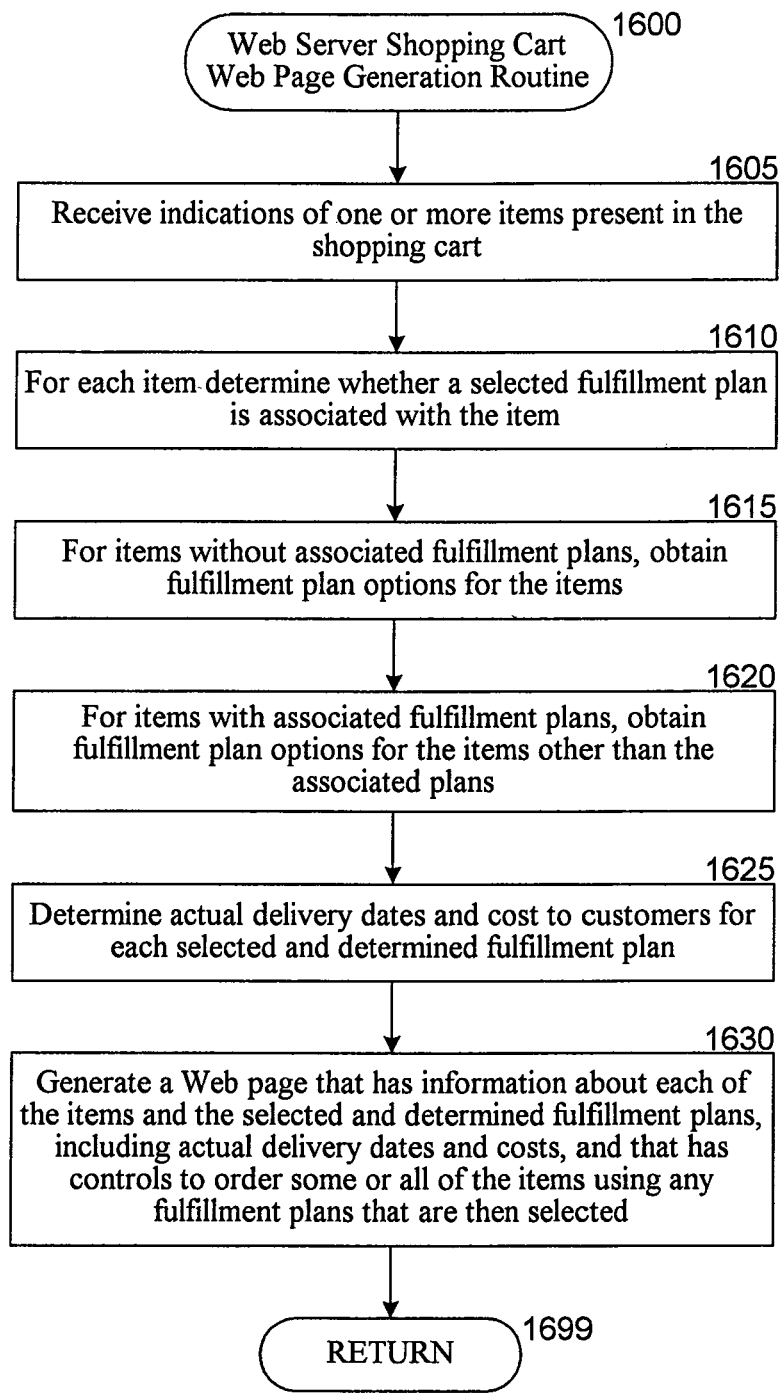
FIG. 16 is a flow diagram of an embodiment of the Web Server Shopping Cart Web Page Generation routine.

FIG. 16 is a flow diagram of an embodiment of the Web Server Shopping Cart Web Page Generation routine 1600. The routine generates a Web page that illustrates a current shopping cart of a user that may include one or more items, determines various information for one or more fulfillment plan options that can be used to order some or all of the items in the shopping cart, and displays such information to the customer. The illustrated routine is similar in some respects to the previously described routine for generating a Web page related to an item of potential interest to a potential customer, such as that in both situations an order has not yet been placed by a customer for the items. However, in the current routine, the potential customer has already expressed some level of interest in ordering the items in the shopping cart as part of the act of placing those item there. In other embodiments, such techniques for determining fulfillment plan options for groups of items could be used in any other situation in which a group of multiple items may be associated together or selected, such as a wish list for a user, a generated list of items that are related to a common topic or theme, a generated list of items that may be of interest to a user, etc.

The routine begins at step 1605 where an indication is received of one or more items that are present in a shopping cart of a potential customer. In step 1610, for each item it is determined whether a selected fulfillment plan has been associated with the item, such as a fulfillment plan that was selected by the user when placing the item in the shopping cart, a fulfillment plan selected by the user to be associated with the item previously but after the item was present in the shopping cart, a fulfillment plan that was used to provide actual delivery date/time information and/or other relevant fulfillment plan information to the customer when information about the item was displayed, etc. In some embodiments, when such selected fulfillment plans were previously associated with items, additional processing may be performed to determine whether such fulfillment plans are still relevant. For example, if a item was placed in a shopping cart based on a fulfillment plan using Next Day Air shipping and that included an actual delivery date of the next day, the previous actual delivery date/time information that was provided to the user will no longer be relevant after the item is in the shopping cart for several days even if the fulfillment plan can still be used.

In the illustrated routine, the routine then continues to step 1615 to identify the items in the shopping cart that do not have associated fulfillment plans, and obtains fulfillment plan options for those items, whether individually or in various groups. In step 1620, for those items that did already have associated fulfillment plans, additional fulfillment plan options are obtained for the items to allow the potential customer to change their mind and select a new fulfillment plan if they so desire, although in other embodiments such options may not be presented to a customer. In step 1625, the routine then determines actual delivery dates/times and/or other relevant information for the fulfillment plans determined or selected for the items in the shopping cart. In step 1630, the routine generates a Web page that represents the shopping cart and that has a variety of information about each of the items and about the various fulfillment plans (e.g., actual delivery date/time information and actual cost to users), as well as various controls to allow the user to select various of the fulfillment plans and/or to allow the user to order some or all of the items using selected fulfillment plans. The routine then continues to step 1699 and then ends.

Thus, in the illustrated embodiments, fulfillment plan information is provided to the user at various times, including before an order is placed, during the ordering process (e.g., in order to provide options to the customer as to a fulfillment plan to be used or to provide a summary of the order), and after an order is placed (e.g., to provide information about a status of the fulfillment of the order). In other embodiments, information may be provided at only some of these times, and/or information may be provided additionally at other times.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. A computer-implemented method comprising:
 receiving, by one or more configured computing systems, an indication of an order for one or more items;
 determining, by the one or more configured computing systems, one of multiple distribution centers that is associated with the indicated order as a default distribution center from which to fulfill the indicated order;
 determining, by the one or more configured computing systems, whether fulfilling the indicated order at the default distribution center would result in an inventory shortage for at least one of the one or more items of the indicated order;
 if it is determined that fulfilling the indicated order at the default distribution center would result in the inventory shortage, determining, by the one or more configured computing systems, an alternate distribution center for the fulfilling of the indicated order; and
 if it is not determined that fulfilling the indicated order at the default distribution center would result in the inventory shortage, determining, by the one or more configured computing systems, to fulfill the indicated order using the default distribution center.

2. The method of claim 1 wherein determining, by the one or more configured computing systems, whether fulfilling the indicated order at the default distribution center would result in the inventory shortage is based at least in part on projections of future orders to be fulfilled by the default distribution center.

3. The method of claim 1 wherein determining, by the one or more configured computing systems, whether fulfilling the indicated order at the default distribution center would result in the inventory shortage is based at least in part on optimal levels of inventory that are determined for the default distribution center.

4. A computer-implemented method comprising:
 receiving, by one or more configured computing systems, an indication of an order;
 determining, by the one or more configured computing systems, one of multiple distribution centers that is associated with the indicated order as a default distribution center from which to fulfill the indicated order;
 determining, by one or more configured computing systems, if fulfilling the indicated order at the default distribution center would result in an overload of work at the default distribution center;
 if it is determined that fulfilling the indicated order at the default distribution center would result in the overload of work, determining, by the one or more configured computing systems, an alternate distribution center for the fulfilling of the indicated order; and
 if it is not determined that fulfilling the indicated order at the default distribution center would result in the overload of work, determining, by the one or more configured computing systems, to fulfill the indicated order using the default distribution center.

5. The method of claim 4 wherein determining whether fulfilling the indicated order at the default distribution center would result in the overload of work is based at least in part on projections of future orders to be fulfilled by the default distribution center.

6. The method of claim 4 wherein determining whether fulfilling of the indicated order at the default distribution center would result in the overload of work is based at least in part on optimal levels of work that are determined for the default distribution center.

7. The method of claim 4 further comprising:
determining, by the one or more configured computing systems, for each of multiple fulfillment plans that are options for fulfilling the indicated order, a cost associated with the fulfillment plan;
selecting one of the multiple fulfillment plans for use in fulfilling of the indicated order based at least in part on the determined cost associated with the selected one of the multiple fulfillment plans; and
initiating fulfilling of the indicated order using the selected one of the multiple fulfillment plans.

8. The method of claim 7 wherein determining, by the one or more configured computing systems, if the fulfilling of the indicated order at the default distribution center would result in the overload of work at the default distribution center is performed as part of the determining of the cost associated with each of one or more of the multiple fulfillment plans, and wherein the selecting of the one of the multiple fulfillment plans includes the determining of the alternate distribution center or the determining to fulfill the indicated order using the default distribution center.

9. The method of claim 8 further comprising, if it is determined that fulfilling the indicated order at the default distribution center would result in the overload of work, including, as part of the cost associated with each of the one or more fulfillment plans, a cost of correcting the overload of work at the default distribution center.

10. The method of claim 9 wherein the cost associated with each of the multiple fulfillment plans further includes a direct cost associated with using the fulfillment plan to fulfill the indicated order.

11. The method of claim 7 wherein selecting one of the multiple fulfillment plans includes, if it is determined that the fulfilling of the indicated order at the default distribution center would result in the overload of work, performing the selecting of the one fulfillment plan based at least in part on the selected one fulfillment plan being associated with the determined alternate distribution center, and otherwise performing the selecting of the one fulfillment plan based at least in part on the selected one fulfillment plan being associated with the default distribution center.

12. The method of claim 4 wherein the indicated order is a potential order that is identified before an instruction has been received to place the order.

13. A non-transitory computer-readable medium having stored contents that configure a computing system to perform a method, the method comprising:
receiving, by the configured computing system, an indication of an order for one or more items;
determining, by the configured computing system, one of multiple distribution centers that is associated with the indicated order as a default distribution center for use in fulfilling the indicated order;
determining, by the configured computing system, whether fulfilling the indicated order from the default distribution center would result in an inventory shortage for at least one of the one or more items of the indicated order;
if it is determined that fulfilling the indicated order from the default distribution center would result in the inventory shortage, determining, by the configured computing system, an alternative distribution center to use for the fulfilling of the indicated order; and
if it is not determined that fulfilling the indicated order from the default distribution center would result in the inventory shortage, determining, by the configured computing system, to fulfill the indicated order using the default distribution center.

14. The non-transitory computer-readable medium of claim 13 wherein the determining of whether fulfilling the indicated order from the default distribution center would result in the inventory shortage is based at least in part on projections of one or more future orders to be fulfilled by the default distribution center and includes determining that fulfilling the indicated order from the default distribution center would result in the inventory shortage, and wherein the method further comprises initiating fulfilling the indicated order using the alternative distribution center.

15. A configured system comprising:
one or more processors of one or more computing systems; and
one or more components that are configured to, when executed by the one or more processors:
receive an indication of an order for one or more items;
determine one of multiple distribution centers that is associated with the indicated order as a default distribution center for fulfilling the indicated order;
determine whether fulfilling the indicated order from the default distribution center would result in an inventory shortage for at least one of the one or more items of the indicated order;
if it is determined that fulfilling the indicated order from the default distribution center would result in the inventory shortage, determine an alternative distribution center to use for the fulfilling of the indicated order; and
if it is not determined that fulfilling the indicated order from the default distribution center would result in the inventory shortage, determine to fulfill the indicated order using the default distribution center.

16. The system of claim 15 wherein the determining of whether fulfilling the indicated order from the default distribution center would result in the inventory shortage is based at least in part on projections of one or more future orders to be fulfilled by the default distribution center and includes determining that fulfilling the indicated order from the default distribution center would not result in the inventory shortage, and wherein the one or more components are further configured to initiate fulfilling the indicated order using the default distribution center.

17. A non-transitory computer-readable medium having stored contents that configure a computing system to perform a method, the method comprising:
receiving, by the configured computing system, an indication of an order for one or more items;
determining, by the configured computing system, one of multiple distribution centers that is associated with the indicated order as a default distribution center for use in fulfilling the indicated order;

determining, by the configured computing system, if fulfilling the indicated order from the default distribution center would result in an overload of work at the default distribution center;

if it is determined that fulfilling the indicated order from the default distribution center would result in the overload of work, determining, by the configured computing system, an alternative distribution center to use for the fulfilling of the indicated order; and if it is not determined that fulfilling the indicated order from the default distribution center would result in the overload of work, determining, by the configured computing system, to fulfill the indicated order using the default distribution center.

18. The non-transitory computer-readable medium of claim 17 wherein the determining of whether fulfilling the indicated order from the default distribution center would result in the overload of work is based at least in part on projections of one or more future orders to be fulfilled by the default distribution center and includes determining that fulfilling the indicated order from the default distribution center would result in the overload of work, and wherein the method further comprises initiating fulfilling the indicated order using the alternative distribution center.

19. A configured system comprising:
one or more processors of one or more computing systems; and
one or more components that are configured to, when executed by the one or more processors:
receive an indication of an order;
determine one of multiple distribution centers that is associated with the indicated order as a default distribution center for fulfilling the indicated order;
determine if fulfilling the indicated order from the default distribution center would result in an overload of work at the default distribution center;
if it is determined that fulfilling the indicated order from the default distribution center would result in the overload of work, determine an alternative distribution center to use for the fulfilling of the indicated order; and
if it is not determined that fulfilling the indicated order from the default distribution center would result in the overload of work, determine to fulfill the indicated order using the default distribution center.

20. The system of claim 19 wherein the determining of whether fulfilling the indicated order from the default distribution center would result in the overload of work is based at least in part on projections of one or more future orders to be fulfilled by the default distribution center and includes determining that fulfilling the indicated order from the default distribution center would not result in the overload of work, and wherein the one or more components are further configured to initiate fulfilling the indicated order using the default distribution center.

* * * * *

UNITED STATES PATENT AND TRADEMARK OFFICE
CERTIFICATE OF CORRECTION

PATENT NO. : 8,428,988 B1  Page 1 of 1
APPLICATION NO. : 13/367284
DATED : April 23, 2013
INVENTOR(S) : Rick Braumoeller et al.

It is certified that error appears in the above-identified patent and that said Letters Patent is hereby corrected as shown below:

On the Title Page

Item (56):
"Graves, S., et al., "A Dynamic Model for Requirements Planning with Application to Supply Chain Optimization," *Operations Research,* 46(Suppl. 3):535-549, May-June 1998, 15 pages." should read, --Graves, S., et al., "A Dynamic Model for Requirements Planning with Application to Supply Chain Optimization," *Operations Research,* 46(Suppl. 3):S35-S49, May-June 1998, 15 pages.--.

Signed and Sealed this
Twelfth Day of November, 2013

Teresa Stanek Rea
*Deputy Director of the United States Patent and Trademark Office*